US011232199B2

(12) United States Patent
Schmugar et al.

(10) Patent No.: US 11,232,199 B2
(45) Date of Patent: Jan. 25, 2022

(54) METHODS AND APPARATUS TO DEFEND AGAINST DLL SIDE-LOADING ATTACKS

(71) Applicant: McAfee, LLC, Santa Clara, CA (US)

(72) Inventors: Craig Schmugar, Beaverton, OR (US); Jyothi Mehandale, Bangalore (IN)

(73) Assignee: MCAFEE, LLC, San Jose, CA (US)

( * ) Notice: Subject to any disclaimer, the term of this patent is extended or adjusted under 35 U.S.C. 154(b) by 164 days.

(21) Appl. No.: 16/728,990

(22) Filed: Dec. 27, 2019

(65) Prior Publication Data

US 2021/0200867 A1 Jul. 1, 2021

(51) Int. Cl.
*G06F 21/12* (2013.01)
*G06F 21/56* (2013.01)
*G06F 21/57* (2013.01)
*H04L 9/06* (2006.01)

(52) U.S. Cl.
CPC .......... *G06F 21/564* (2013.01); *G06F 21/126* (2013.01); *G06F 21/566* (2013.01); *G06F 21/572* (2013.01); *H04L 9/0643* (2013.01)

(58) Field of Classification Search
CPC .......... G06F 21/51; G06F 21/55; G06F 21/56; G06F 21/126; G06F 21/564; G06F 21/566; G06F 21/572; G06F 11/302; H04L 9/0643; H04L 9/3247
See application file for complete search history.

(56) References Cited

U.S. PATENT DOCUMENTS

| | | | | |
|---|---|---|---|---|
| 7,117,371 | B1* | 10/2006 | Parthasarathy | G06F 21/51 713/187 |
| 10,860,719 | B1* | 12/2020 | Lukach | G06F 21/54 |
| 2009/0133126 | A1* | 5/2009 | Jang | G06F 21/56 726/24 |
| 2017/0032121 | A1* | 2/2017 | Kim | G06F 21/56 |

(Continued)

FOREIGN PATENT DOCUMENTS

GB 2572637 B * 9/2020 ............. G06F 21/51

OTHER PUBLICATIONS

FireEye. "DLL Side-loading: A Thorn in the Side of the Anti-Virus Industry", 2014. (Year: 2014).*

(Continued)

*Primary Examiner* — Michael Simitoski
(74) *Attorney, Agent, or Firm* — Hanley, Flight & Zimmerman, LLC

(57) ABSTRACT

Methods, apparatus, systems, and articles of manufacture are disclosed to defend against dynamic-link library (DLL) side-loading attacks. An example apparatus includes a fingerprint generator to determine a first DLL fingerprint of a first DLL stored at a first OS path referenced by an operating system (OS) event generated by a computing device, and, in response to determining that a second DLL having the same name as the first DLL is stored at a second OS path superseding the first OS path, determine a second DLL fingerprint of the second DLL, a fingerprint comparator to determine whether at least one of the first or the second DLL fingerprint satisfies a deviation threshold based on a com- (Continued)

parison of the first and the second DLL fingerprint to a reference DLL fingerprint, and a security action enforcer to execute a security action to protect a computing device from an attack.

35 Claims, 10 Drawing Sheets

(56) References Cited

U.S. PATENT DOCUMENTS

2021/0073374 A1\* 3/2021 Mookken ............ G06F 9/44521
2021/0160265 A1\* 5/2021 Chittaro ................ G06N 20/00

OTHER PUBLICATIONS

Kwon, Taeho, and Zhendong Su. "Automatic detection of unsafe dynamic component loadings." IEEE Transactions on Software Engineering 38.2 (2011): 293-313 (Year: 2011).\*

B. Min and V. Varadharajan, "Secure Dynamic Software Loading and Execution Using Cross Component Verification," 2015 45th Annual IEEE/IFIP International Conference on Dependable Systems and Networks, 2015, pp. 113-124, doi: 10.1109/DSN.2015.17. (Year: 2015).\*

\* cited by examiner

400

FEATURES

| EXECUTABLE FEATURES | WEIGHT |
|---|---|
| FULL PATH NAME | 1.0 |
| IMPORTED FUNCTIONS LIST | 0.7 |
| DIGITAL SIGNATURE | 1.0 |
| HIGH-LEVEL LANGAUGE | 2.1 |
| COMPILER | 1.8 |
| FILE VERSION | 0.5 |

410

| DLL FEATURES | WEIGHT |
|---|---|
| FULL PATH NAME | 0.9 |
| EXPORTED FUNCTIONS LIST | 0.8 |
| DIGITAL SIGNATURE | 1.2 |
| HIGH-LEVEL LANGUAGE | 2.7 |
| COMPILER | 2.2 |
| FILE VERSION | 0.7 |

METHODS AND APPARATUS TO DEFEND AGAINST DLL SIDE-LOADING ATTACKS

FIELD OF THE DISCLOSURE

This disclosure relates generally to computer security and, more particularly, to methods and apparatus to defend against dynamic-link library (DLL) side-loading attacks.

BACKGROUND

Malicious software, known as "malware," can attack various computing devices via a network, such as the Internet. Malware may include any program or file that is intentionally harmful to a computer, such as computer virus programs, Internet bots, spyware, computer worms and other standalone malware computer programs that replicate to spread to other computers, Trojan horse and other non-replicating malware, or any computer program that gathers information about a computer, its user, or otherwise operates without permission. Protecting computing devices from such malware can be a significant challenge.

BRIEF DESCRIPTION OF THE DRAWINGS

FIG. 4 depicts example executable features and example DLL features that can be used by the example DLL security controller of FIGS. 1 and/or 2 to identify malware.

The figures are not to scale. In general, the same reference numbers will be used throughout the drawing(s) and accompanying written description to refer to the same or like parts.

Figure 1:
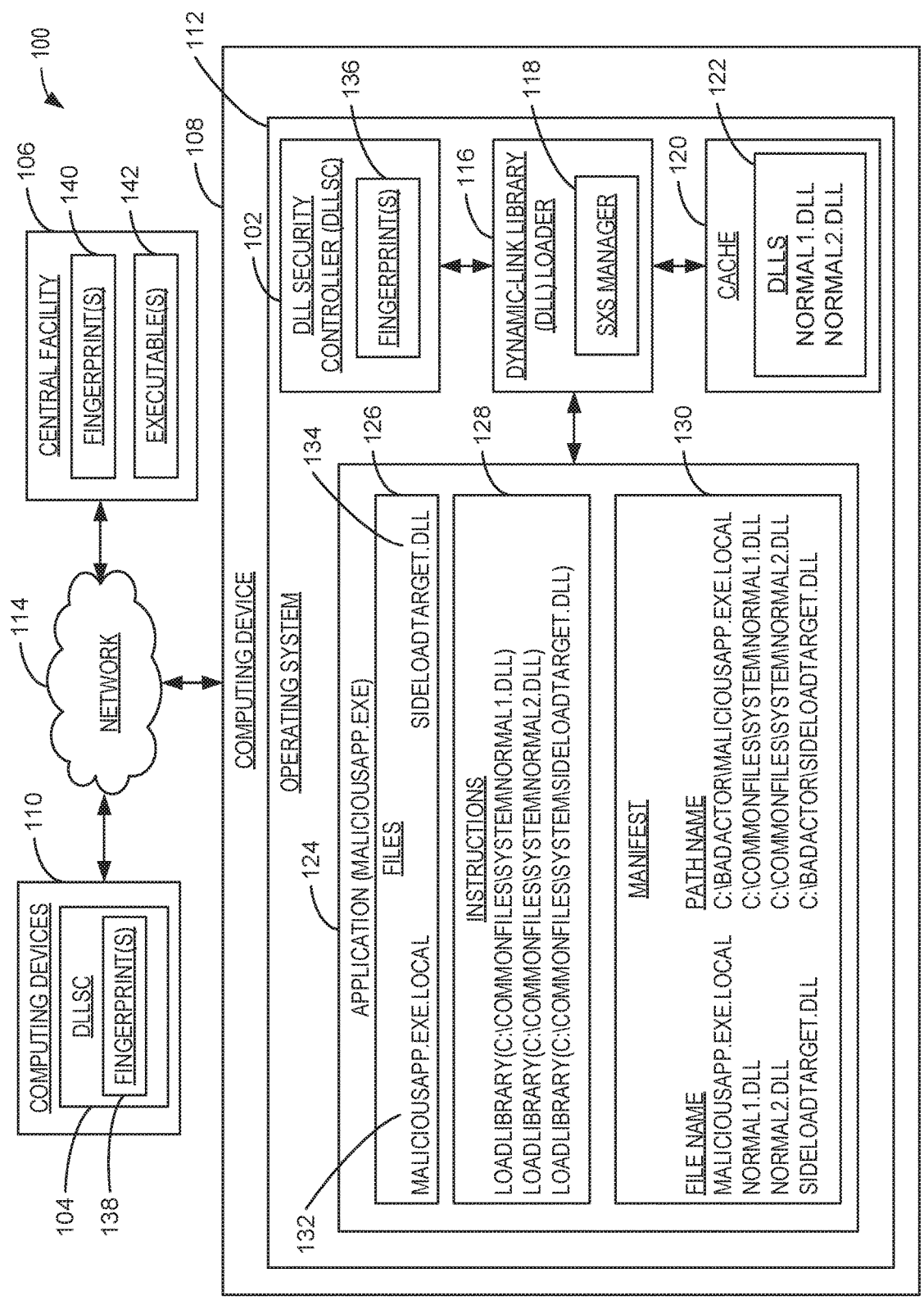
FIG. 1 is a schematic illustration of an example computer security environment including an example dynamic-link library (DLL) security controller and an example central facility to identify malware.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In computing environments, malicious actors aim to conceal their attacks on computing devices, computing systems, etc., by leveraging legitimate or trusted software applications. A common attack strategy can be abusing or exploiting trusted executables (e.g., executable files with an ".EXE" file name extension, computer readable executables, etc.) during execution. For example, a malicious actor can exploit vulnerabilities associated with an executable file loading additional functions via modules, such as dynamic-link library (DLL) files or DLLs.

Malicious actors can target vulnerabilities associated with DLLs by executing a DLL side-loading attack or exploit. A DLL side-loading attack can occur when malicious code (e.g., one or more malicious files, one or more malicious scripts, etc.) assumes the place of legitimate code (e.g., one or more legitimate or trusted files, one or more legitimate or trusted scripts, etc.). One type of DLL side-loading attack can occur by exploiting a path hierarchy of an operating system. For example, an attacker can supersede a target DLL (e.g., an intended DLL, a trusted DLL, etc.) having a first path (e.g., a first load path, a first operating system (OS) path, etc.) by placing a malicious DLL in a second path representative of a local path (e.g., a path in a side-by-side (SxS) assembly, a SxS assembly path, a subdirectory of an OS, etc.). In such examples, the OS can load the malicious DLL in the local path rather than the target DLL in the first path.

Another type of DLL side-loading attack can occur by compromising an application installation triggered by loading a trusted executable. The application installation can be compromised by replacing a target DLL (e.g., a trusted DLL) that is to be called by the trusted executable with a malicious DLL. For example, a user of a computing device can inadvertently replace the target DLL in memory with the malicious DLL, where the malicious DLL has the same name as the target DLL. The user can obtain the malicious DLL from a compromised peripheral device (e.g., an external hard-drive disc, a Universal Serial Bus (USB) thumb drive, etc.), a compromised email message or attachment, etc. In such examples, in response to loading the trusted executable that invokes the target DLL, the OS of the computing device can load the malicious DLL in place of the target DLL.

Yet another type of DLL side-loading attack can occur by compiling and/or distributing a trusted executable with a malicious DLL. For example, an attacker can re-compile a first executable including a trusted DLL as a second executable including a malicious DLL. In such examples, a computing device can install the malicious DLL by installing the second executable instead of the intended first executable.

By strategically replacing or pre-empting the loading of an intended DLL with that which contains malicious code using the above-described DLL side-loading attacks, an attacker can exploit or take advantage of the trust associated with an executable that invokes the intended DLL. Some prior techniques for defending against DLL side-loading attacks include identifying malicious code within DLLs or software vendors hardening their executables against such attacks. For instance, a software vendor can add increased specificity to DLL calls or invocations of an intended DLL to increase a probability that the intended DLL is called when launching an executable of the software vendor. However, in some instances, malicious attackers can modify malicious code in new ways that prior machine-learning, fingerprinting, and/or signature algorithms have not encountered. In some instances, software vendors refrain from adding increased specificity to DLL calls to improve interoperability between (1) executables of the software vendors and (2) different DLL versions of and/or, more generally, different OS versions executed by computing devices.

Examples disclosed herein include an example DLL security controller to defend against DLL side-loading attacks. In some disclosed examples, the DLL security controller calculates, generates, and/or otherwise determines a fingerprint (e.g., a DLL fingerprint) of one or more target DLLs invoked by an executable. For example, the DLL fingerprint can include, correspond to, and/or otherwise be representative of a relationship between a caller (e.g., the executable) and the called (e.g., the referenced DLL). In such examples, the DLL fingerprint can be based on a list of imported functions of the executable, a high-level language (HLL) of the executable and/or the referenced DLL, a compiler used to generate the executable and/or the referenced DLL, etc., and/or a combination thereof. The example DLL security controller can compare the target DLL fingerprint(s) to reference DLL fingerprint(s). For example, the reference DLL fingerprint(s) can be stored on a computing device, a trusted execution environment (TEE) of the computing device, etc.

In some disclosed examples, the DLL security controller determines whether a superseded path exists. For example, the DLL security controller can determine that a target DLL is included in a local path (e.g., a path of the executable, a SxS path, etc.) (e.g., a local path DLL) of the computing device. In such examples, the DLL security controller can identify the local path DLL as a superseded DLL located at a superseded path. In some disclosed examples, the DLL security controller can calculate a DLL fingerprint of the superseded DLL and compare the superseded DLL fingerprint to the reference DLL fingerprint(s) of the computing device. In such disclosed examples, the DLL security controller can determine that the superseded DLL(s) are malicious DLL(s) based on the comparison. In response to the determination, the example DLL security controller can execute one or more security actions or tasks to protect the computing device from the malicious DLL(s).

In some disclosed examples, the DLL security controller transmits the target DLL fingerprint(s) to an example central facility (e.g., one or more computing systems, one or more servers, a cloud computing environment or platform, etc.) in response to determining that a superseded path does not exist. In such disclosed examples, the central facility can compare the target DLL fingerprint(s) to reference DLL fingerprint(s) stored in the central facility. For example, the reference DLL fingerprint(s) of the central facility can be generated by the central facility in response to the central facility receiving requests from a plurality of computing devices to analyze target DLLs.

In some disclosed examples, the DLL security controller and/or the central facility determines that a threshold has been met and/or otherwise satisfied based on a comparison of a target DLL fingerprint and a reference DLL fingerprint. For example, the threshold being satisfied can be indicative of a DLL, and/or, more generally, the executable associated with the DLL, as being compromised or associated with an attack. In such examples, the DLL security controller and/or the central facility can identify an attack, an exploit, etc., based on the threshold being satisfied. In some disclosed examples, in response to determining that the threshold has been satisfied, the DLL security controller executes security action(s) to defend against the DLL side-loading attack, such as generating a log, blocking execution of the executable, replacing the malicious DLL(s), etc., and/or a combination thereof.

FIG. 1 is a schematic illustration of an example environment 100 including example dynamic-link library (DLL) security controllers (DLLSCs) 102, 104 and an example central facility 106 to identify a malware attack associated with example computing devices 108, 110 including a first example computing device 108 and second example computing devices 110. In FIG. 1, the environment is a security environment (e.g., a computer security environment), a malware security or protection environment, etc. In FIG. 1, the second computing devices 110 include two or more computing devices, a plurality of computing devices, etc.

In the illustrated example of FIG. 1, the computing devices 108, 110 of FIG. 1 are personal computers (e.g., desktop computers, laptop computers, etc.) using and/or otherwise executing an example operating system (OS) 112. Alternatively, one or more of the computing devices 108, 110 may be a server, a mobile device (e.g., a smartphone, a tablet, etc.), or any other type of computing device.

In the illustrated example of FIG. 1, the first computing device 108 and the second computing devices 110 are in communication with the central facility 106 via an example network 114. The network 114 of the example of FIG. 1 is the Internet. However, the network 114 can be implemented using any suitable wired and/or wireless network(s) including, for example, one or more data buses, one or more Local Area Networks (LANs), one or more wireless LANs, one or more cellular networks, one or more private networks, one or more public networks, etc.

In the illustrated example of FIG. 1, the computing devices 108, 110 include a respective one of the DLL security controllers 102, 104 including a first example DLL security controller 102 and second example DLL security controllers 104. In FIG. 1, the first computing device includes the first DLL security controller 102 and the second computing devices 110 include a respective one of the second DLL security controllers 104. In some examples, the first DLL security controller 102 is the same as one or more of the second DLL security controllers 104. For example, a first version (e.g., a first hardware and/or software version) of the first DLL security controller 102 and a second version (e.g., a first hardware and/or software version) of a respective one of one or more of the second DLL security controllers 104 can be the same. In some examples, the first DLL security controller 102 is different from one or more of the second DLL security controllers 104. For example, the first version and a respective version of one or more of the second DLL security controllers 104 can be different. In some examples, a first one of the second DLL security controllers 104 can be different from one or more of the other second DLL security controllers 104. As used herein, the description of the first DLL security controller 102 can be applicable to one or more of the second DLL security controllers 104. Likewise, the description of the one or more of the second DLL security controllers 104 can be applicable to the first DLL security controller 102.

In the illustrated example of FIG. 1, the OS 112 and/or, more generally, the first computing device 108, includes an example DLL loader 116, an example side-by-side (SxS) manager 118, example cache 120, example DLLs 122, and an example application (maliciousapp.exe) 124. In FIG. 1, the application 124 is an executable. For example, the application 124 can be a malicious executable application that, when executed, can implement and/or otherwise execute a DLL side-loading attack on the OS 112 and/or, more generally, the first computing device 108.

In the illustrated example of FIG. 1, the application 124 includes example files (e.g., executable or application files) 126, example instructions (e.g., executable or application instructions) 128, and an example manifest (e.g., an executable or application manifest) 130. In FIG. 1, the files 126 include example computer readable and/or computer executable files that, when executed, can execute an intended function. In FIG. 1, the files 126 include a first example file (maliciousapp.exe.local) 132 and a second example file (sideloadtarget.dll) 134 that, when executed by the OS 112, can execute and/or otherwise carry out a DLL side-loading attack, exploit, and/or other malicious action(s). For example, the second file 134 can be a malicious DLL. Additionally or alternatively, the files 126 may include more files than the first file 132 and the second file 134 depicted in FIG. 1.

In the illustrated example of FIG. 1, the first file 132 is a redirection file. For example, a presence of the first file 132 in a local folder path of the application 124 can cause the OS 112 to first check the local folder path when the OS 112 loads a DLL. In such examples, the OS 112 can first check the local folder path regardless of the path name specified to the DLL loader 116. For example, a local path name of the application 124 can be "C:\badactor". In such examples, the presence of the first file 132 in the local path name can cause the DLL loader 116 to load the second file 134 instead of loading another DLL in the cache 120 that has the same file name as the second file 134. In other examples, when the DLL loader 116 obtains instructions to load the DLL with the file name "normal1.DLL," the DLL loader 116 first determines if the DLL is in the local path name "C:\badactor" and, if the DLL is not located in the local path name "C:\badactor," loads the DLL "normal1.DLL" from the cache 120.

In the illustrated example of FIG. 1, the OS 112 loads the application 124 and identifies data (e.g., a table of data, an imports table, an imported functions table, an imported functions list, etc.) included in the application 124. For example, the manifest 130 can include an imported functions list that includes one or more libraries of functions that the application 124 imports, such as one or more functions, classes, variables, resources, etc., associated with and/or otherwise included in the "normal1.dll," "normal2.dll," and "sideloadtarget.dll" DLLs. In such examples, the DLL loader 116 can search for the DLL "normal1.dll" based on the imported functions list and import one or more functions from the "normal1.dll" to the application 124.

In the illustrated example of FIG. 1, the second file 134 is a DLL. For example, in response to executing the application 124, the OS 112 loads the second file 134 and identifies data (e.g., a table of data, an exports table, an exported functions table, an exported functions list, etc.) included in the second file 134. In such examples, the second file 134 can include an exported functions list that includes name(s) of function(s) that the second file 134 exports to other executables. For example, the exported functions list can connect addresses (e.g., an address in the cache 120, memory, an HDD, etc.) to each of the functions inside the second file 134. In such examples, the application 124 can use a first address corresponding to a first function of the second file 134 when the application 124 intends to call or execute the first function of the second file 134.

In the illustrated example of FIG. 1, the application 124 includes the instructions 128 that, when executed, instruct the DLL loader 116 and/or, more generally, the OS 112, to install the application 124. For example, the instructions 128 include load library instructions that, when executed, can invoke the DLL loader 116 to install a first DLL "normal1.DLL" and a second DLL "normal2.DLL" from the cache 120, and install a third DLL "sideloadtarget.DLL" from a local path folder of the application 124. Additionally or alternatively, the instructions 128 may include more files than the files 126 depicted in FIG. 1.

In the illustrated example of FIG. 1, the application 124 includes the manifest 130 to specify a file name and a path name for respective one(s) of executable and/or DLL files associated with an installation of the application 124. The manifest 130 of the example of FIG. 1 is an Extensible Markup Language (XML) file that includes information, parameters, settings, etc., that informs and/or otherwise causes the OS 112 to facilitate an installation of the application 124. Alternatively, the manifest 130 may be any other type of file and/or have any other type of computer readable format.

In the illustrated example of FIG. 1, the manifest 130 includes a first file name "maliciousapp.exe.local" and a first path name "C:\badactor\maliciousapp.exelocal" for the executable "maliciousapp.exe," where the file name has an extension of ".local." By having the extension of ".local," the DLL loader 116 can identify that the first file name is a redirection file and ignore the contents of the redirection file. In FIG. 1, the manifest 130 includes a file name and a path name for DLLs referenced by the application 124 (e.g., "normal1.dll," "normal2.dll," and "sideloadtarget.dll").

In the illustrated example of FIG. 1, the OS 112 includes the DLL loader 116 to extract information from the application 124 and load a referenced DLL based on the extracted information. In some examples, the DLL loader 116 extracts information from the application 124, such as the files 126 and/or the instructions 128. In some examples, the DLL loader 116 extracts information from the application 124, such as file name(s), path name(s), and/or, more generally, information included in the manifest 130. In some examples, the DLL loader 116 loads the second file 134 in response to an installation of the application 124.

In the illustrated example of FIG. 1, the DLL loader 116 includes the SxS manager 118 to name, bind, version, deploy, and/or configure a DLL, such as the DLLs 122 of FIG. 1. In FIG. 1, the SxS manager 118 accesses the cache 120 to retrieve and/or otherwise obtain one of the DLLs 122. For example, in response to the OS 112 installing the application 124, the SxS manager 118 can determine whether the application 124 has a local copy of one or more referenced DLLs as described in the manifest 130. For example, the SxS manager 118 can invoke the DLL loader 116 to load the second file 134 instead of a DLL in the cache 120 based on information in the manifest 130. In other examples, the SxS manager 118 can invoke the DLL loader 116 to load one of the DLLs 122, such as "normal1.dll," in response to the SxS manager 118 determining that the application 124 does not have a local copy (e.g., a copy in the local path "C:\badactor").

In the illustrated example of FIG. 1, the cache 120 is software cache. For example, the cache 120 can store data, such as the DLLs 122, so that future requests for the DLLs 122 can be served faster. In such examples, the cache 120 can include the DLLs 122 that correspond to an earlier computation or a copy of data stored elsewhere (e.g., stored on a hard-disc drive (HDD), stored in random access memory (RAM), etc.). Additionally or alternatively, the cache 120 may be hardware, such as an HDD, RAM, etc.

In the illustrated example of FIG. 1, the first DLL security controller 102 monitors for an event generated by an operating system (OS) of the first computing device 108 to detect a malware attack or exploit being executed on the first computing device 108. In some examples, the event is an OS event, such as a process creation event (e.g., a program or application being executed by the OS), a service creation event (e.g., a service being executed by the OS), a load library event (e.g., a DLL load event, a loading of a DLL, etc.), etc.

In some examples, the first DLL security controller 102 monitors for the event by subscribing to OS notifications. For example, the first DLL security controller 102 can provide a callback function to the OS 112. The callback function enables the first DLL security controller 102 to subscribe to an OS notification generated by the OS 112 in response to the creation event. For example, in response to the OS 112 invoking a DLL (e.g., invoking a loading of a DLL), such as the second file 134, the OS 112 can generate an OS notification indicative of and/or otherwise corresponding to the invoking of the second file 134. In such examples, in response to generating the OS notification, the OS 112 can call or invoke the callback function. The first DLL security controller 102 can determine that the second file 134 has been invoked and/or, more generally, determine that the event has been created, in response to the callback function being invoked.

In some examples, the first DLL security controller 102 generates a fingerprint (e.g., a DLL fingerprint) of the invoked DLL, such as the second file 134. In some examples, the DLL fingerprint describes and/or otherwise is representative of a relationship (e.g., a list of imported functions, one or more addresses corresponding to a DLL, etc.) between the caller of a DLL (e.g., the application 124) and the DLL, properties (e.g., static properties) of the DLL, etc., and/or a combination thereof. For example, the first DLL security controller 102 can extract features from the second file 134, the application 124, etc., and/or a combination thereof. In such examples, the first DLL security controller 102 can extract DLL features from the second file 134, such as a path name (e.g., a full path name) of the second file 134, an exported functions list of the second file 134, etc. In other examples, the first DLL security controller 102 can extract executable features from the application 124, such as a high-level language (HLL) used to generate the application 124, a compiler (e.g., a compiler name, a compiler type, a compiler identifier, etc.) that compiled the application 124, etc.

In some examples, the first DLL security controller 102 generates the DLL fingerprint based on at least one of the DLL features or the executable features. For example, the first DLL security controller 102 can generate the DLL fingerprint by executing a hash function on the DLL features, the executable features, etc., to generate hash values. In such examples, the first DLL security controller 102 can generate the DLL fingerprint by concatenating the hash values or portion(s) thereof.

In some examples, the first DLL security controller 102 can compare the DLL fingerprint to first example reference fingerprint(s) (e.g., reference DLL fingerprint(s)) 136. For example, the first reference fingerprint(s) 136 can be DLL fingerprints previously generated by the first DLL security controller 102 of the first computing device 108, one or more of the second computing devices 110, the central facility 106, etc., and/or a combination thereof. In FIG. 1, the second computing devices 110 include second example reference fingerprint(s) 138. In some examples, the first reference fingerprint(s) 136 are the same as the second reference fingerprint(s) 138. In some examples, one or more of the first reference fingerprint(s) 136 are different from one or more of the second reference fingerprint(s) 138.

In the illustrated example of FIG. 1, the central facility 106 can detect a malware attack at a computing device, such as the first computing device 108, one or more of the second computing devices 110, etc., and/or a combination thereof. In some examples, the central facility 106 detects the malware attack by comparing a DLL fingerprint obtained from the first computing device 108, one or more of the second computing devices 110, etc., to third example reference fingerprint(s) 140. For example, the central facility 106 can obtain a first DLL fingerprint from the first computing device 108, where the first DLL fingerprint is based on the second file 134. In such examples, the central facility 106 can detect a malware attack at the first computing device 108 in response to the first DLL fingerprint matching one of the third reference DLL fingerprint(s) 140 or portion(s) thereof, where the matching reference DLL fingerprint is known to be associated with the malware attack. In other examples, the central facility 106 can detect the malware attack by determining whether a difference between (1) the first DLL fingerprint and (2) one of the third reference fingerprint(s) satisfies a threshold (e.g., a deviation threshold, a DLL deviation threshold, etc.). For example, the central facility 106 can determine that the difference satisfies the deviation threshold in response to the difference being greater than the deviation threshold. In other examples, the central facility 106 can determine whether the first DLL fingerprint has deviated from one(s) of the third reference fingerprint(s) 140 known to be associated with trusted DLL(s) and/or are DLL fingerprint(s) not known to be associated with a malware attack.

In some examples, the central facility 106 generates and transmits an alert based on the comparison of the first DLL fingerprint and one(s) of the third reference fingerprint(s) 140. For example, the central facility 106 can transmit an alert to the first computing device 108 in response to the central facility 106 determining that the second file 134 is not a malicious DLL. In other examples, the central facility 106 can transmit an alert to the first computing device 108 in response to the central facility 106 determining that the second file 134 is a malicious DLL and/or otherwise associated with a malware attack. In some examples, in response to obtaining the alert indicative of the malware attack, the first DLL security controller 102 and/or, more generally, the first computing device 108, can execute one or more security actions to protect the first computing device 108 from the malware attack.

In the illustrated example of FIG. 1, the third reference fingerprint(s) 140 can be DLL fingerprints previously generated by the first DLL security controller 102 of the first computing device 108, one or more of the second computing devices 110, the central facility 106, etc., and/or a combination thereof. In such examples, the central facility 106 can obtain one or more of the third reference fingerprint(s) 140 from the first computing device 108, one or more of the second computing devices 110, etc. In some examples, the third reference fingerprint(s) 140 are the same as the first reference fingerprint(s) 136 and the second reference fingerprint(s) 138. In some examples, one or more of the first reference fingerprint(s) 136, one or more of the second reference fingerprint(s) 138, and/or one or more of the third reference fingerprint(s) 140 can be different.

In some examples, the central facility 106 updates one or more of the DLL security controllers 102, 104 by pushing and/or otherwise transmitting example executable(s) 142 generated and/or stored by the central facility 106 to one(s) of the computing device(s) 108, 110. For example, the first DLL security controller 102 of FIG. 1 can correspond to a first software version of 1.0. In such examples, the central facility 106 can obtain telemetry data from the first DLL security controller 102 that includes the first software version. The central facility 106 can determine that the first DLL security controller 102 is to be upgraded because the central facility 106 includes one of the executable(s) 142 that corresponds to a second software version of 2.0 that is newer than the first software version. The central facility 106 can transmit the executable(s) 142 corresponding to the second software version to the first computing device 108 to upgrade the first DLL security controller 102 with the newer version to protect against malware attacks.

In some examples, the central facility 106 generates the executable(s) 142 based on telemetry data and/or DLL fingerprint(s) obtained from the first computing device 108, one or more of the second computing devices 110, etc. For example, the central facility 106 can obtain a first DLL fingerprint from the first computing device 108 and store the first DLL fingerprint as one of the third reference fingerprint(s) 140. In such examples, the central facility 106 can generate the executable(s) 142 to include the third reference fingerprint(s) 140.

In the illustrated example of FIG. 1, the central facility 106 can include, correspond to, and/or otherwise be representative of one or more servers (e.g., computing servers). For example, the central facility 106 can include one or more cloud-based servers, where ones of the cloud-based servers have different functions. In such examples, the central facility 106 can include a first cloud-based server that stores one(s) of the third reference fingerprint(s) 140, one(s) of the executable(s) 142, etc., while a second cloud-based server different from the first cloud-based server manages and/or otherwise controls telemetry aggregation operations and fingerprint analysis operations.

In some examples, the central facility 106 facilitates one or more downloads of the executable(s) 142 to the first computing device 108, one or more of the second computing devices 110, etc., from a content delivery or a content distribution network (CDN). For example, the central facility 106 can include, correspond to, and/or otherwise be representative of a geographically distributed network of proxy servers and corresponding data centers (e.g., a data center including one or more computer servers) to deliver software, such as the executable(s) 142 to the first computing device 108, one or more of the second computing devices 110, etc., based on a geographic location of requesting one(s) of the computing device(s) 108, 110, an origin of respective requests for the executable(s) 142, telemetry data obtained from the computing device(s) 108, 110, etc.

Figure 2:
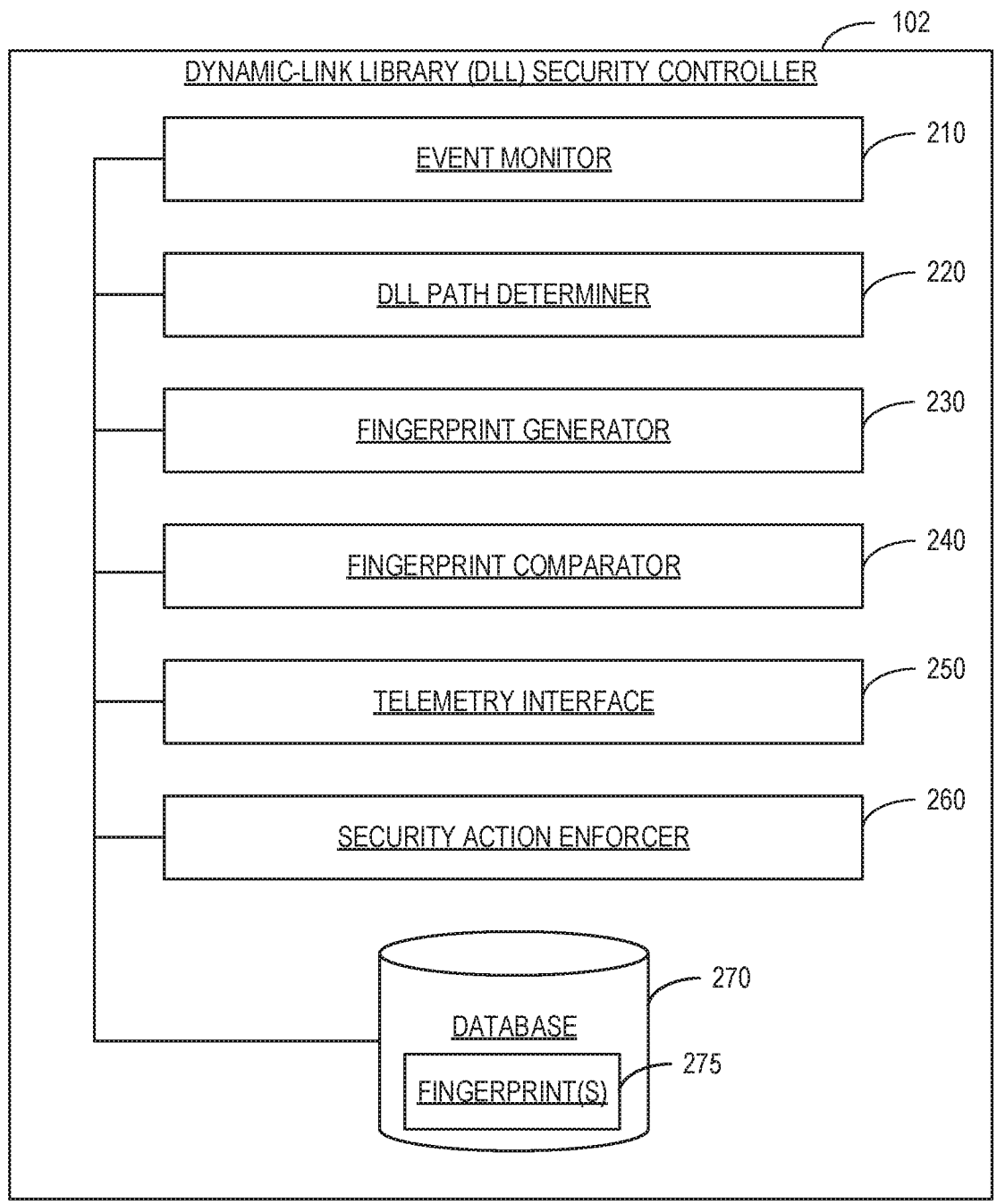
FIG. 2 is a block diagram of the example DLL security controller of FIG. 1.

FIG. 2 is a block diagram of the first DLL security controller 102 of FIG. 1. Although the block diagram of FIG. 2 represents a single DLL security controller, multiple instances of the block diagram of FIG. 2 can be used to implement multiple DLL security controllers such as the first DLL security controller 102, one or more of the second DLL security controllers 104, etc., of FIG. 1. In the illustrated example of FIG. 2, the first DLL security controller 102 includes an example event monitor 210, an example DLL path determiner 220, an example fingerprint generator 230, an example fingerprint comparator 240, an example telemetry interface 250, an example security action enforcer 260, an example database 270, and example reference fingerprint(s) 275.

In the illustrated example of FIG. 2, the first DLL security controller 102 includes the event monitor 210 to monitor for an event generated by the OS 112 of FIG. 1. In some examples, the event monitor 210 detects an OS event, such as a process creation event, a service creation event, a load library event, etc. For example, the event monitor 210 can detect and/or otherwise determine that a DLL has been invoked by an event of the OS 112 of the first computing device 108. In some examples, the event monitor 210 detects the event by generating and/or providing a callback function to the OS 112, where the callback function corresponds to the event. In such examples, the event monitor 210 can detect the event in response to the callback function being called by the OS 112.

In the illustrated example of FIG. 2, the first DLL security controller 102 includes the DLL path determiner 220 to determine a path name of a referenced or invoked DLL. In some examples, the DLL path determiner 220 determines whether an invoked DLL is included in a launched executable (e.g., the application 124 of FIG. 1). In such examples, the DLL path determiner 220 can determine that the path name of the invoked DLL is a local path of the launched executable based on the invoked DLL being included in the launched executable.

In some examples, the DLL path determiner 220 determines whether a superseded path of a referenced DLL exists. For example, in response to the DLL path determiner 220 determining that the invoked DLL is included in the same directory as an executable file (e.g., maliciousapp.exe, the application 124, etc.), the DLL path determiner 220 can determine whether the invoked DLL is stored at a different location on the OS 112 and/or, more generally, the first computing device 108. For example, the DLL path determiner 220 can determine that a DLL with the same file name as the second file 134 of FIG. 1 is not stored in the cache 120 of FIG. 1, or elsewhere on the OS 112 and/or, more generally, the first computing device 108. In such examples, the DLL path determiner 220 can determine that a superseded path for the second file 134 does not exist. In other examples, the DLL path determiner 220 can determine that a superseded path for the second file 134 exists when the DLL path determiner 220 detects that a DLL with the same file name as the second file 134 is stored on the OS 112 and/or, more generally, the first computing device 108.

In the illustrated example of FIG. 2, the first DLL security controller 102 includes the fingerprint generator 230 to calculate, determine, and/or otherwise generate a DLL fingerprint based on a DLL (e.g., a target DLL, a referenced DLL, the second file 134, etc.) and/or an executable (e.g., the application 124) that calls the DLL. In some examples, the fingerprint generator 230 extracts DLL features from the DLL and/or executable features from the executable. In such examples, the fingerprint generator 230 can generate a DLL fingerprint based on at least one of the DLL features or the executable features.

In some examples, the fingerprint generator 230 extracts DLL features from the DLL such as a full path name of the DLL, an exported functions list associated with and/or otherwise included in the DLL, a digital signature (e.g., information including the digital signature, digital signature information, etc.) of the DLL, an HLL of the DLL, a compiler that compiled the DLL, a file version of the DLL, etc. In some examples, the fingerprint generator 230 extracts executable features from the executable such as a full path name of the executable, an imported functions list associated with and/or otherwise included in the executable, a digital signature of the executable (e.g., digital signature data or information associated with and/or based on the executable), an HLL of the executable, a compiler that compiled the executable, a file version of the executable, etc.

In some examples, the fingerprint generator 230 generates a DLL fingerprint of an invoked DLL. For example, the fingerprint generator 230 can generate a DLL fingerprint based on the second file 134 in response to the application 124 invoking or calling the second file 134. In some examples, the fingerprint generator 230 generates a DLL of a superseded DLL, or a DLL stored at a local path of the application 124, where the superseded DLL has the same file name as the invoked DLL.

In some examples, the fingerprint generator 230 generates a DLL fingerprint by executing a hash function on one or more DLL features, one or more executable features, etc., and/or a combination thereof. For example, the fingerprint generator 230 can execute a cyclic redundancy check (CRC) hash function on a first DLL feature to determine a first hash value, a second DLL feature to determine a second hash value, a first executable feature to determine a third hash value, a second executable feature to determine a fourth hash value, etc., and/or a combination thereof. In such examples, the fingerprint generator 230 can generate the DLL fingerprint by concatenating one or more of the first hash value, the second hash value, etc.

In the illustrated example of FIG. 2, the first DLL security controller 102 includes the fingerprint comparator 240 to compare a DLL fingerprint to one or more reference fingerprints. In some examples, the fingerprint comparator 240 compares a DLL fingerprint of an invoked DLL to one(s) of the first reference fingerprint(s) 136 of FIG. 1. For example, the fingerprint comparator 240 can compare a DLL fingerprint based on the second file 134 to one or more of the first reference fingerprint(s) 136. In such examples, the fingerprint comparator 240 can determine whether the DLL fingerprint matches one or more portions of one(s) of the first reference fingerprint(s) 136 known to be associated with a malware attack.

In some examples, the fingerprint comparator 240 determines whether the DLL fingerprint deviates from any of the first reference fingerprint(s) 136 known to be associated with trusted DLL(s) (e.g., a trusted DLL fingerprint). For example, the fingerprint comparator 240 can determine that a difference between the DLL fingerprint (e.g., one or more portions of the DLL fingerprint) and a first one of the first reference fingerprint(s) 136 (e.g., one or more portions of the first one of the first reference fingerprint(s) 136) satisfies a deviation threshold. For example, the fingerprint comparator 240 can determine that the difference satisfies the deviation threshold in response to the difference being greater than the deviation threshold.

In some examples, the difference can be a Hamming distance and/or any other distance (e.g., a bit distance, a string distance, etc.) between strings or sets of bits. In such examples, the fingerprint comparator 240 can calculate and/or otherwise determine a Hamming distance between (1) a first bit string based on the DLL fingerprint and (2) a second bit string based on one of the first reference fingerprint(s) 136. In some examples, the first bit string is one or more portions of the DLL fingerprint and the second bit string is one or more portions of the first one of the first reference fingerprint(s) 136. For example, the first bit string can include a first set of bits corresponding to a full path name of the second file 134, a second set of bits corresponding to an HLL of the second file 134, etc. In such examples, the second bit string can include a first set of bits corresponding to a full path name of a DLL associated with the first one of the first reference fingerprint(s) 136, a second set of bits corresponding to a HLL of the DLL associated with the first one of the first reference fingerprint(s) 136, etc.

In some examples, the fingerprint comparator 240 determines whether the difference (e.g., the Hamming distance) satisfies a deviation threshold representative of and/or otherwise corresponding to the DLL fingerprint deviating from trusted DLL fingerprint(s) beyond an acceptable or expected quantity of deviation. In some examples, in response to determining that the difference satisfies a deviation threshold, the fingerprint comparator 240 determines and/or otherwise identifies that the DLL fingerprint is associated with a malicious DLL. For example, the fingerprint comparator 240 can determine that the DLL (e.g., the second file 134) associated with the DLL fingerprint being analyzed is (e.g., likely is, probabilistically is, etc.) a malicious file (e.g., a malicious DLL) that can be used to execute a malware attack at the first computing device 108. In some examples, the fingerprint comparator 240 can transmit the DLL fingerprint to the central facility 106 to be stored as one of the third reference fingerprint(s) 140. In some examples, the fingerprint comparator 240 stores an association between the DLL fingerprint and an identifier (e.g., a malicious DLL fingerprint identifier, a malicious file identifier, etc.), where the identifier can be indicative of the DLL fingerprint being associated with a malware attack, a malicious DLL, etc.

In some examples, in response to determining that the difference does not satisfy the deviation threshold, the fingerprint comparator 240 determines and/or otherwise identifies that the DLL fingerprint is associated with a trusted DLL. For example, the fingerprint comparator 240 can determine that the DLL (e.g., the second file 134) associated with the DLL fingerprint being analyzed is (e.g., likely is, probabilistically is, etc.) a trusted file (e.g., a trusted DLL) that can be safely executed by the first computing device 108.

In the illustrated example of FIG. 2, the first DLL security controller 102 includes the telemetry interface 250 to transmit telemetry data to the central facility 106. For example, the telemetry data can include a DLL (e.g., the second file 134), a DLL fingerprint based on the DLL, a superseded DLL fingerprint associated with the DLL, one or more features associated with the DLL and/or the executable that called the DLL, a software version of the first DLL security controller 102, etc., and/or a combination thereof. In such examples, in response to the DLL path determiner 220 detecting a superseded path associated with the second file 134, the telemetry interface 250 can transmit the superseded DLL fingerprint to the central facility 106 to compare the superseded DLL fingerprint against the third reference fingerprint(s) 140.

In some examples, the telemetry interface 250 executes requests from the central facility 106 for telemetry data associated with the computing devices 108, 110. In some examples, the central facility 106 transmits a request to one(s) of the computing device(s) 108, 110 for telemetry data. For example, the central facility 106 can request the first computing device 108 to provide telemetry data associated with the first DLL security controller 102, the OS 112, and/or, more generally, the first computing device 108. In such examples, in response to the request, the telemetry interface 250 can transmit telemetry data including a software version of the first DLL security controller 102, an OS version and/or a provider of the OS 112, etc., and/or a combination thereof. For example, the central facility 106 can determine a corresponding one of the executable(s) 142 to send to the first computing device 108 based on the telemetry data. In such examples, the central facility 106 can send a first one of the executable(s) 142 having a compatible OS version and/or OS provider as that of the OS 112 based on the telemetry data obtained from the first computing device 108.

In the illustrated example of FIG. 2, the first DLL security controller 102 includes the security action enforcer 260 to detect a malware attack at the first computing device 108 and execute security action(s) to protect the first computing device 108 from the malware attack. In some examples, the security action enforcer 260 detects an attack, an exploit, etc., in response to a deviation threshold being satisfied. In some examples, the security action enforcer 260 detects an attack, an exploit, etc., in response to obtaining an alert from the central facility 106. For example, the telemetry interface 250 can transmit a DLL fingerprint based on the second file 134 to the central facility 106. The central facility 106 can determine that a difference between the DLL fingerprint and one(s) of the third reference fingerprint(s) satisfy a deviation threshold. The central facility 106 can transmit an alert to the telemetry interface 250, where the alert can be indicative of the deviation threshold being satisfied. In response to obtaining the alert, the security action enforcer 260 can determine that the second file 134 is associated with a malware attack.

In some examples, the security action enforcer 260 can execute one or more security actions in response to a detection of an attack on the OS 112 and/or, more generally, the first computing device 108. For example, the security action enforcer 260 can execute a security action by generating a log that includes data or information corresponding to an identified malicious DLL (e.g., the second file 134), one or more events that caused the malicious DLL to be invoked, an application (e.g., the application 124) that invoked the malicious DLL, the DLL fingerprint associated with the malicious DLL, description(s) of security action(s) executed by the security action enforcer 260, etc. In such examples, the security action enforcer 260 can invoke the telemetry interface 250 transmit the log and/or corresponding information to the central facility 106.

In some examples, the security action enforcer 260 executes a security action by preventing a malicious DLL from loading, unloading the malicious DLL, etc. For example, the security action enforcer 260 can prevent the second file 134 from being loaded into memory or halt the application 124 from executing function(s) included in the second file 134. In other examples, in response to the second file 134 being loaded into memory of the first computing device 108, the security action enforcer 260 can unload the second file 134 from the memory.

In some examples, the security action enforcer 260 executes a security action by suspending and/or terminating a process associated with the malicious DLL. For example, the security action enforcer 260 can pause an execution of the application 124 and/or cancel the execution of the application 124.

In some examples, the security action enforcer 260 quarantines the malicious DLL and/or an associated executable. For example, the security action enforcer 260 can move the second file 134, the application 124, etc., and/or a combination thereof to a trusted execution environment (TEE), a sandbox, etc. In such examples, the TEE, the sandbox, etc., can be in a protected portion of the cache 120 of FIG. 1 or in memory associated with the first DLL security controller 102.

In the illustrated example of FIG. 2, the first DLL security controller 102 includes the database 270 to store or record data including example reference fingerprint(s) 275. In some examples, the reference fingerprint(s) 275 can correspond to the first reference fingerprint(s) 136 of FIG. 1, the second reference fingerprint(s) 138 of FIG. 1, etc., and/or a combination thereof. Additionally or alternatively, the example database 270 may include executable(s), telemetry data, telemetry parameters, etc. The example database 270 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 270 may additionally or alternatively be implemented by one or more double data rate (DDR) memories, such as DDR, DDR2, DDR3, mobile DDR (mDDR), etc. The example database 270 may additionally or alternatively be implemented by one or more mass storage devices such as hard disk drive(s), compact disk drive(s) digital versatile disk drive(s), etc. While in the illustrated example the database 270 is illustrated as a single database, the database 270 can be implemented by any number and/or type(s) of databases. Furthermore, the data stored in the database 270 can be in any data format such as, for example, binary data, comma delimited data, tab delimited data, structured query language (SQL) structures, etc.

While an example manner of implementing the first DLL security controller 102 of FIG. 1 is illustrated in FIG. 2, one or more of the elements, processes, and/or devices illustrated in FIG. 2 may be combined, divided, re-arranged, omitted, eliminated and/or implemented in any other way. Further, the example event monitor 210, the example DLL path determiner 220, the example fingerprint generator 230, the example fingerprint comparator 240, the example telemetry interface 250, the example security action enforcer 260, the example database 270, the example reference fingerprint(s) 275 and/or, more generally, the first example DLL security controller 102 of FIG. 1 may be implemented by hardware, software, firmware and/or any combination of hardware, software and/or firmware. Thus, for example, any of the example event monitor 210, the example DLL path determiner 220, the example fingerprint generator 230, the example fingerprint comparator 240, the example telemetry interface 250, the example security action enforcer 260, the example database 270, the example reference fingerprint(s) 275 and/or, more generally, the first example DLL security controller 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event monitor 210, the example DLL path determiner 220, the example fingerprint generator 230, the example fingerprint comparator 240, the example telemetry interface 250, the example security action enforcer 260, the example database 270, and/or the example reference fingerprint(s) 275 is/are hereby expressly defined to include a non-transitory computer readable storage device or storage disk such as a memory, a digital versatile disk (DVD), a compact disk (CD), a Blu-ray disk, etc. including the software and/or firmware. Further still, the first example DLL security controller 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In the illustrated example of FIG. 2, the first DLL security controller 102 includes means for determining (e.g., first means for determining) to determine a first DLL fingerprint of a first DLL (e.g., the second file 134) referenced by an operating system (OS) event, where the OS event can be generated by one(s) of the computing device(s) 108, 110 and the first DLL can be stored at a first OS path. In some examples, in response to determining that a second DLL (e.g., a superseded DLL having the same name as the second file 134) is stored at a second OS path, the means for determining can determine a second DLL fingerprint of the second DLL. In such examples, the second DLL can have the same name as the first DLL and the second OS path can supersede the first OS path.

In some examples, the means for determining is to extract a feature (e.g., a DLL feature, a feature as described below in connection with FIG. 4) from the first DLL, execute a hash algorithm on the feature to generate a hash value, and determine the first DLL fingerprint based on the hash value. In some examples, where the feature is a first feature and the hash value is a first hash value, the means for determining is to, in response to determining that an executable triggered the OS event, extract a second feature (e.g., an executable feature, a feature as described below in connection with FIG. 4) from the executable, execute the hash algorithm on the second feature to generate a second hash value, and determine the first DLL fingerprint based on at least one of the first hash value or the second hash value.

In the illustrated example of FIG. 2, the first DLL security controller 102 includes second means for determining whether the first DLL is included in an executable (e.g., the application 124 of FIG. 1), and, in response to determining that the first DLL is included in the executable, determining whether the second DLL is stored at the second OS path.

In these examples, the first means for determining and/or the second means for determining is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the fingerprint generator 230 of FIG. 2 can implement the first means for determining. In some examples, the DLL path determiner 220 of FIG. 2 can implement the second means for determining.

In the illustrated example of FIG. 2, the first DLL security controller 102 includes means for comparing to compare the first DLL fingerprint and the second DLL fingerprint to a reference DLL fingerprint (e.g., one(s) of the first reference fingerprint(s) 136). In some examples, the means for comparing can determine whether at least one of the first DLL fingerprint or the second DLL fingerprint satisfies a deviation threshold based on the comparison.

In this example, the means for comparing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the fingerprint comparator 240 of FIG. 2 can implement the means for comparing.

In the illustrated example of FIG. 2, the first DLL security controller 102 includes means for executing a security action to protect the computing device (e.g., one(s) of the computing device(s) 108, 110) from an attack (e.g., a malware attack, a DLL side-loading attack, etc.) in response to the deviation threshold being satisfied.

In the illustrated example of FIG. 2, the first DLL security controller 102 includes means for transmitting a first DLL to a server (e.g., the central facility 106 of FIG. 1). In some examples, in response to obtaining an alert from the server, the means for executing executes the security action, the alert indicative of the server determining that the first DLL satisfied a deviation threshold based on a comparison of the first DLL to a reference fingerprint (e.g., one(s) of the third reference fingerprint(s) 140), where the reference fingerprint can be different from one(s) of the first reference fingerprint(s) 136, one(s) of the second reference fingerprint(s) 138, etc., and/or a combination thereof.

In these examples, the means for executing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the security action enforcer 260 of FIG. 2 can implement the means for executing.

In these examples, the means for transmitting is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, a communication device (e.g., a transmitter, a receiver, a transceiver, a modem, a residential gateway, a wireless access point, a network interface, etc.) structured to perform the corresponding operation without executing software or firmware, but other structures are likewise appropriate. In some examples, the means for transmitting is implemented by an Ethernet interface, a universal serial bus (USB) interface, a Bluetooth® interface, an NFC interface, and/or a PCI express interface. In some examples, the telemetry interface 250 of FIG. 2 can implement the means for transmitting.

In the illustrated example of FIG. 2, the first DLL security controller 102 includes means for storing data (e.g., the first reference fingerprint(s) 136). In this example, the means for storing is implemented by a volatile memory, a non-volatile memory, one or more DDR memories, one or more mass storage devices, etc., and/or a combination thereof. In some examples, the means for storing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the database 270 of FIG. 2 can implement the means for storing.

Figure 3:
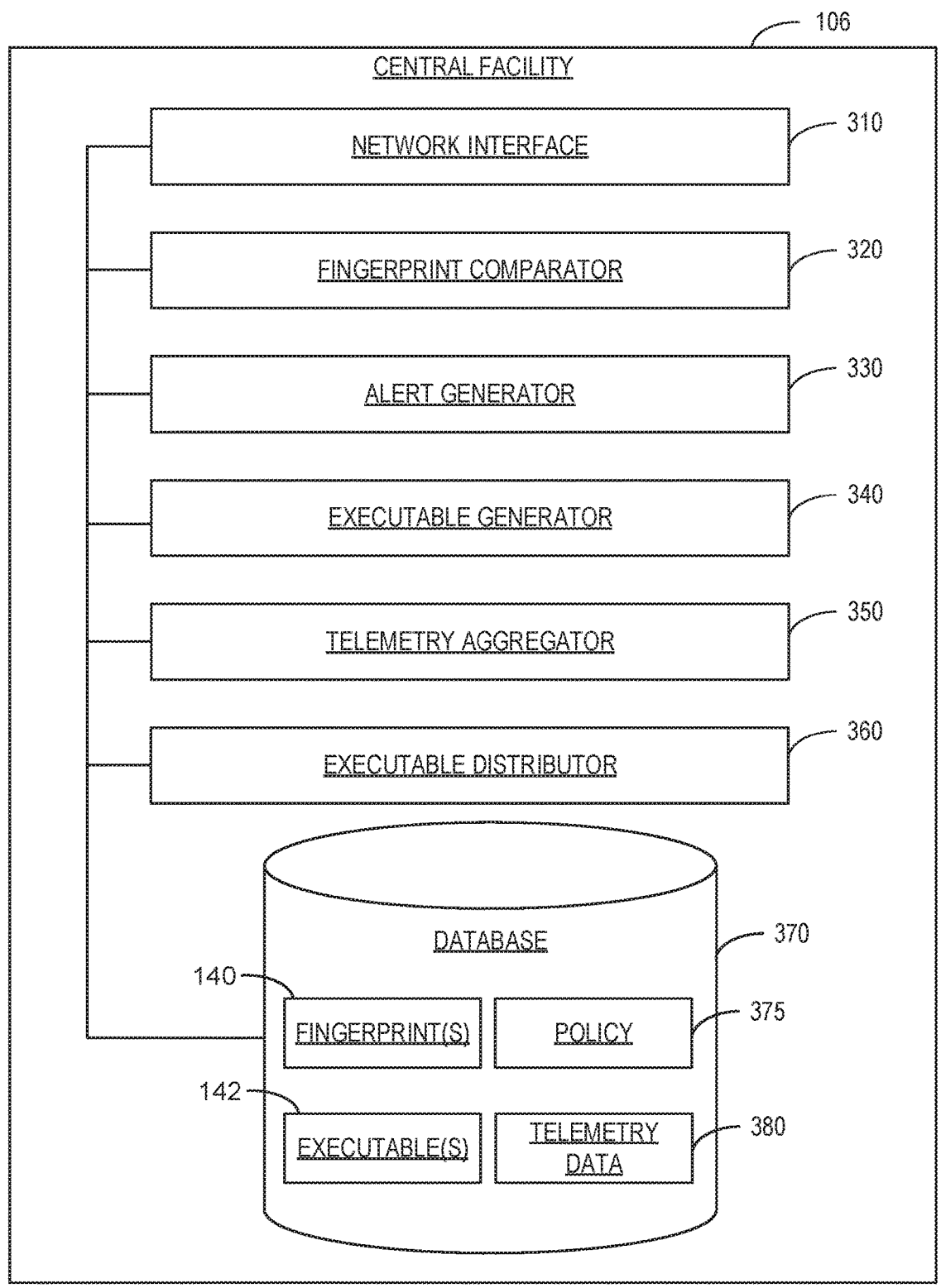
FIG. 3 is a block diagram of the example central facility of FIG. 1.

FIG. 3 is a block diagram of the central facility 106 of FIG. 1. In some examples, the central facility 106 compares DLL fingerprint(s) from requesting one(s) of the computing devices 108, 110 of FIG. 1 to detect and/or otherwise identify an attack, an exploit, etc., to that the requesting one(s) of the computing device(s) 108, 110 can be vulnerable against. In FIG. 3, the central facility 106 includes an example network interface 310, an example fingerprint comparator 320, an example alert generator 330, an example executable generator 340, an example telemetry aggregator 350, an executable distributor 360, an example database 370. In FIG. 3, the database 370 includes the third reference fingerprint(s) 140, the executable(s) 142 of FIG. 1, an example policy (e.g., a distribution policy, an update policy, etc.) 375, and example telemetry data 380.

In the illustrated example of FIG. 3, the central facility 106 includes the network interface 310 to obtain information from and/or transmit information to the network 114 of FIG. 1. The network interface 310 implements a web server that receives request(s), DLL fingerprint(s), the telemetry data 380, etc., from one(s) of the computing device(s) 108, 110. In some examples, the web server of the network interface 310 transmits alert(s), one(s) of the executable(s) 142, etc., to the one(s) of the computing device(s) 108, 110. The information managed by the network interface 310 is formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 3, the central facility 106 includes the fingerprint comparator 320 to compare a DLL fingerprint obtained from one(s) of the computing device(s) 108, 110 of FIG. 1 to the third reference fingerprint(s) 140. For example, the fingerprint comparator 320 can obtain a DLL fingerprint from the first computing device 108 that is based on the second file 134. In such examples, the fingerprint comparator 320 can determine whether the DLL fingerprint matches one or more portions of one(s) of the third reference fingerprint(s) 140 known to be associated with a malware attack.

In some examples, the fingerprint comparator 320 determines whether the DLL fingerprint deviates from one or more portions of one(s) of the third reference fingerprint(s) 140 known to be associated with trusted DLL(s) (e.g., a trusted DLL fingerprint). For example, the fingerprint comparator 320 can determine that a difference between the DLL fingerprint (e.g., one or more portions of the DLL fingerprint) and a first one of the third reference fingerprint(s) 140 (e.g., one or more portions of the first one of the third reference fingerprint(s) 140) satisfies a deviation threshold. In such examples, the difference can be a Hamming distance and/or any other distance between strings or sets of bits. In such examples, the fingerprint comparator 320 can calculate a Hamming distance between (1) a first bit string based on the DLL fingerprint obtained from first computing device 108 and (2) a second bit string based on one of the third reference fingerprint(s) 140. In some examples, the first bit string is one or more portions of the DLL fingerprint and the second bit string is one or more portions of the first one of the third reference fingerprint(s) 140. For example, the first bit string can include a first set of bits corresponding to a full path name of the second file 134, a second set of bits corresponding to an HLL of the second file 134, etc. In such examples, the second bit string can include a first set of bits corresponding to a full path name of a DLL associated with the first one of the third reference fingerprint(s) 140, a second set of bits corresponding to a HLL of the DLL associated with the first one of the third reference fingerprint(s) 140, etc.

In some examples, the fingerprint comparator 320 determines whether the difference (e.g., the Hamming distance) satisfies a deviation threshold representative of and/or otherwise corresponding to the DLL fingerprint deviating from trusted DLL fingerprint(s) beyond an acceptable or expected quantity of deviation. In some examples, in response to determining that the difference satisfies a deviation threshold, the fingerprint comparator 320 determines and/or otherwise identifies that the DLL fingerprint is associated with a malicious DLL. For example, the fingerprint comparator 320 can determine that the DLL (e.g., the second file 134) associated with the DLL fingerprint being analyzed is (e.g., likely is, probabilistically is, etc.) a malicious file (e.g., a malicious DLL) that can be used to execute a malware attack at the first computing device 108. In some examples, the fingerprint comparator 320 can store the DLL fingerprint in the database 370 as one of the third reference fingerprint(s) 140. In some examples, the fingerprint comparator 320 stores an association between the DLL fingerprint and an identifier (e.g., a malicious DLL fingerprint identifier, a malicious file identifier, etc.), where the identifier can be indicative of the DLL fingerprint being associated with a malware attack, a malicious DLL, etc.

In some examples, in response to determining that the difference does not satisfy the deviation threshold, the fingerprint comparator 320 determines and/or otherwise identifies that the DLL fingerprint is associated with a trusted DLL. For example, the fingerprint comparator 320 can determine that the DLL (e.g., the second file 134) associated with the DLL fingerprint being analyzed is (e.g., likely is, probabilistically is, etc.) a trusted file (e.g., a trusted DLL) that can be safely executed by the first computing device 108.

In the illustrated example of FIG. 3, the central facility 106 includes the alert generator 330 to generate an alert based on a comparison between DLL fingerprint(s) obtained from one(s) of the computing device(s) 108, 110 and one(s) of the third reference fingerprint(s) 140. In some examples, the alert generator 330 generates an alert, an indication, a message, a warning, etc., in response to a DLL fingerprint being identified as being associated with a trusted DLL. In such examples, the alert generator 330 can invoke the network interface 310 to transmit the alert to the requesting one(s) of the computing device(s) 108, 110. In response to obtaining the alert, the one(s) of the computing device(s)

108, 110 can determine that the DLL fingerprint transmitted to the central facility 106 is associated with a trusted DLL.

In some examples, the alert generator 330 generates an alert, an indication, a message, a warning, etc., in response to a DLL fingerprint being identified as being associated with a malicious DLL. In such examples, the alert generator 330 can invoke the network interface 310 to transmit the alert to the requesting one(s) of the computing device(s) 108, 110. In response to obtaining the alert, the one(s) of the computing device(s) 108, 110 can determine that the DLL fingerprint transmitted to the central facility 106 is associated with a malicious DLL. In such examples, the one(s) of the computing device(s) 108, 110 can execute security action(s) to protect the one(s) of the computing device(s) 108, 110 from the malicious DLL.

In the illustrated example of FIG. 3, the central facility 106 includes the executable generator 340 to generate the executable(s) 142. In some examples, the executable generator 340 generates the executable(s) 142 by updating malware protection parameter(s) including the third reference fingerprint(s) 140, one or more weight values as described below in connection with FIG. 4, etc. For example, the executable generator 340 can determine to generate new, revised, updated, etc., one(s) of the executable(s) 142 in response to storing one or more DLL fingerprints in the database 370, updating one or more weight values, etc. In some examples, the executable generator 340 generates the executable(s) 142 including one(s) of the third reference fingerprint(s) 140, updated one(s) of the weight values, etc.

In the illustrated example of FIG. 3, the central facility 106 includes the telemetry aggregator 350 to generate a distribution policy 375 based on the telemetry data 380. For example, the telemetry aggregator 350 can invoke the network interface 310 to obtain the telemetry data 380 from one(s) of the computing device(s) 108, 110. In such examples, the telemetry aggregator 350 can determine whether one(s) of the computing device(s) 108, 110 include an out-of-date version of the DLL security controllers 102, 104 based on software version information included in the obtained portion(s) of the telemetry data 380. The telemetry aggregator 350 can generate the distribution policy 375 based on one(s) of the computing device(s) 108, 110 to receive the executable(s) 142 to update respective one(s) of the DLL security controller(s) 102, 104.

In the illustrated example of FIG. 3, the central facility 106 includes the executable distributor 360 to distribute the executable(s) 142 to one(s) of the computing device(s) 108, 110 based on the distribution policy 375. In some examples, the executable distributor 360, and/or, more generally, the central facility 106, can implement and/or otherwise correspond to CDN. In some examples, in response to the executable generator 340 generating the executable(s) 142, the executable distributor 360 can invoke the network interface 310 to transmit the executable(s) 142 to one(s) of the computing device(s) 108, 110 of FIG. 1. For example, the executable distributor 360 can identify one(s) of the computing device(s) 108, 110 to receive the executable(s) 142 based on the one(s) of the computing device(s) 108, 110 being included and/or otherwise referenced by the distribution policy 375.

In the illustrated example of FIG. 3, the central facility 106 includes the database 370 to store or record data including updated malware protection parameter(s), the third reference fingerprint(s) 140, the executable(s) 142, the distribution policy 375, the telemetry data 380, etc. In some examples, the telemetry data 380 includes a DLL (e.g., the second file 134), a DLL fingerprint based on the DLL, a superseded DLL fingerprint associated with the DLL, one or more features associated with the DLL and/or the executable that called the DLL, a software version of the first DLL security controller 102, etc., and/or a combination thereof.

In some examples, the database 370 can be implemented by a volatile memory (e.g., a SDRAM, DRAM, RDRAM, etc.) and/or a non-volatile memory (e.g., flash memory). The example database 370 may additionally or alternatively be implemented by one or more DDR memories, such as DDR, DDR2, DDR3, mDDR, etc. The example database 370 may additionally or alternatively be implemented by one or more mass storage devices such as hard disk drive(s), compact disk drive(s) digital versatile disk drive(s), etc. While in the illustrated example the database 370 is illustrated as a single database, the database 370 can be implemented by any number and/or type(s) of databases. Furthermore, the data stored in the database 370 can be in any data format such as, for example, binary data, comma delimited data, tab delimited data, SQL structures, etc.

While an example manner of implementing the central facility 106 of FIG. 1 is illustrated in FIG. 3, one or more of the elements, processes and/or devices illustrated in FIG. 3 may be combined, divided, re-arranged, omitted, eliminated and/or implemented in any other way. Further, the example network interface 310, the example fingerprint comparator 320, the example alert generator 330, the example executable generator 340, the example telemetry aggregator 350, the executable distributor 360, the example database 370, the third example reference fingerprint(s) 140, the example executable(s) 142, the example distribution policy 375, the telemetry data 380, and/or, more generally, the example central facility 106 of FIG. 1 may be implemented by hardware, software, firmware and/or any combination of hardware, software and/or firmware. Thus, for example, any of the example network interface 310, the example fingerprint comparator 320, the example alert generator 330, the example executable generator 340, the example telemetry aggregator 350, the executable distributor 360, the example database 370, the third example reference fingerprint(s) 140, the example executable(s) 142, the example distribution policy 375, the telemetry data 380 and/or, more generally, the example central facility 106 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example network interface 310, the example fingerprint comparator 320, the example alert generator 330, the example executable generator 340, the example telemetry aggregator 350, the executable distributor 360, the example database 370, the third example reference fingerprint(s) 140, the example executable(s) 142, the example distribution policy 375, and/or the telemetry data 380 is/are hereby expressly defined to include a non-transitory computer readable storage device or storage disk such as a memory, a DVD, a CD, a Blu-ray disk, etc. including the software and/or firmware. Further still, the example central facility 106 of FIG. 1 may include one or more elements, processes and/or devices in addition to, or instead of, those illustrated in FIG. 3, and/or may include more than one of any or all of the illustrated elements, processes and devices.

In the illustrated example of FIG. 3, the central facility 106 includes means for obtaining a DLL fingerprint from one(s) of the computing device(s) 108, 110 of FIG. 1 and means for transmitting an alert to the one(s) of the computing device(s) 108, 110. In this example, the means for obtaining and/or the means for transmitting is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, a communication device (e.g., a transmitter, a receiver, a transceiver, a modem, a residential gateway, a wireless access point, a network interface, etc.) structured to perform the corresponding operation without executing software or firmware, but other structures are likewise appropriate. In some examples, the means for obtaining and/or the means for transmitting is/are implemented by an Ethernet interface, a universal serial bus (USB) interface, a Bluetooth® interface, an NFC interface, and/or a PCI express interface. In some examples, the network interface 310 of FIG. 3 can implement the means for obtaining and/or the means for transmitting.

In the illustrated example of FIG. 3, the central facility 106 includes means for comparing DLL fingerprint(s) (e.g., DLL fingerprint(s) obtained from one(s) of the computing device(s) 108, 110) to reference fingerprint(s) (e.g., one(s) of the third reference fingerprint(s) 140). In this example, the means for comparing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the fingerprint comparator 320 of FIG. 3 can implement the means for comparing.

In the illustrated example of FIG. 3, the central facility 106 includes means for generating (e.g., first means for generating) an alert. In this example, the means for generating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the alert generator 330 of FIG. 3 can implement the means for generating.

In the illustrated example of FIG. 3, the central facility 106 includes means for generating (e.g., second means for generating) executable(s) (e.g., one(s) of the executable(s) 142). In this example, the means for generating (e.g., the second means for generating) is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the executable generator 340 of FIG. 3 can implement the means for generating (e.g., the second means for generating).

In the illustrated example of FIG. 3, the central facility 106 includes means for aggregating telemetry data (e.g., the telemetry data 380 of FIG. 3). In this example, the means for aggregating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the telemetry aggregator 350 of FIG. 3 can implement the means for aggregating.

In the illustrated example of FIG. 3, the central facility 106 includes means for distributing executable(s) (e.g., one(s) of the executable(s) 142). In this example, the means for distributing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the executable distributor 360 of FIG. 3 can implement the means for distributing.

In the illustrated example of FIG. 3, the central facility 106 includes means for storing data (e.g., the third reference fingerprint(s) 140, the executable(s) 142, the policy 375, the telemetry data 380, etc.). In this example, the means for storing is implemented by a volatile memory, a non-volatile memory, one or more DDR memories, one or more mass storage devices, etc., and/or a combination thereof. In some examples, the means for storing is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the database 370 of FIG. 3 can implement the means for storing.

FIG. 4 depicts example executable features 410 and example DLL features 420 that can be used by one(s) of the DLL security controller(s) 102, 104 of FIGS. 1 and/or 2 to identify malware. In FIG. 4, the executable features 410 are representative of and/or otherwise correspond to data or information associated with an executable, such as the application 124 of FIG. 1. In FIG. 4, the executable features 410 and the DLL features 420 have a respective weight value. The executable features 410 can include fewer or more executable features than the executable features 410 depicted in FIG. 4. The DLL features 420 can include fewer or more DLL features than the DLL features 420 depicted in FIG. 4. The weight values are exemplary and one or more of the weight values in depicted FIG. 4 can have a different value than depicted in FIG. 4.

In the illustrated example of FIG. 4, the executable features 410 include features of an executable (e.g., features extracted from the application 124), such as a full path name, an imported functions list, a digital signature, a high-level language (HLL), a compiler, and a file version. For example, the full path name can correspond to a full path name (e.g., C:\badactor\maliciousapp.exelocal) of the application 124 of FIG. 1. The imported functions list can include one or more functions included in the manifest 130 and/or, more generally, the application 124 of FIG. 1. The digital signature can correspond to executing a hash function (e.g., a CRC hash function) on the application 124 of FIG. 1 to generate a hash value (e.g., a checksum, a CRC hash value, etc.) based on the application 124.

In some examples, the HLL corresponds to the HLL used to develop, generate, etc., the application 124 of FIG. 1. For example, the HLL can be an instruction language, a scripting language, a programming language, etc. In such examples, the HLL can correspond to any of the following languages: C, C++, Java, C#, Perl, Python, JavaScript, HTML, SQL, Swift, etc. Alternatively, the HLL may be any other language.

In some examples, the compiler corresponds to a type of a compiler (e.g., hardware and/or software that can compile human readable code into machine readable code), a version (e.g., a hardware version, a software version, etc.) of the compiler, etc., and/or a combination thereof that compiled the application 124 of FIG. 1. In some examples, the file version corresponds to a software version, a software build number, etc., of the application 124 of FIG. 1.

In the illustrated example of FIG. 4, the DLL features 420 include features of a DLL (e.g., features extracted from the second file 134), such as a full path name, an exported functions list, a digital signature, a high-level language (HLL), a compiler, and a file version. For example, the full path name can correspond to a full path name (e.g., C:\badactor\sideloadtarget.dll) of the second file 134 of FIG. 1. The exported functions list can include one or more functions included in the second file 134. The digital signature can correspond to executing a hash function (e.g., a CRC hash function) on the second file 134 of FIG. 1 to generate a hash value (e.g., a checksum, a CRC hash value, etc.) based on the second file 134.

In some examples, the HLL corresponds to the HLL used to develop, generate, etc., the second file 134 of FIG. 1. For example, the HLL can be an instruction language, a scripting language, a programming language, etc. In such examples, the HLL can correspond to any of the following languages: C, C++, Java, C#, Perl, Python, JavaScript, HTML, SQL, Swift, etc. Alternatively, the HLL may be any other language.

In some examples, the compiler corresponds to a type of a compiler (e.g., hardware and/or software that can compile human readable code into machine readable code), a version (e.g., a hardware version, a software version, etc.) of the compiler, etc., and/or a combination thereof that compiled the second file 134 of FIG. 1. In some examples, the file version corresponds to a software version, a software build number, etc., of the second file 134 of FIG. 1.

In some examples, the DLL security controllers 102, 104 of FIG. 1 can detect a malware attack based on comparing a DLL fingerprint to one(s) of the reference fingerprint(s) 136, 138 of FIG. 1 using one(s) of the features 400 of FIG. 4. For example, the fingerprint comparator 240 of FIG. 2 can compare a DLL fingerprint based on the second file 134 to a first reference fingerprint (e.g., a first one of the first reference fingerprint(s) 136). In such examples, the DLL fingerprint and the first reference fingerprint can each include a concatenation of bit strings. For example, the DLL fingerprint can include a first bit string based on the full path name of the application 124 that called the second file 134, a second bit string based on the HLL of the second file 134, etc., where the second bit string follows or is after the first bit string in a concatenation of the first and second bit strings. The first reference fingerprint can include a third bit string based on the full path name of an executable that called a DLL associated with the first reference fingerprint, a fourth bit string based on the HLL of the DLL, etc., where the fourth bit string follows or is after the third bit string in a concatenation of the third and fourth bit strings.

In some examples, the fingerprint comparator 240 can determine that (1) the first bit string matches the third bit string and (2) the second bit string does not match the fourth bit string. The fingerprint comparator 240 can determine that the second file 134 is a malicious DLL based on the full path names matching but the HLLs being different. As the full path name has a weight of 1.0 and the HLL has a weight of 2.7, the fingerprint comparator 240 can determine that the DLL is more likely to be a malicious DLL based on the HLLs being different rather than the DLL being a trusted DLL based on the full path names matching.

In some examples, the executable generator 340 of FIG. 3, and/or, more generally, the central facility 106 of FIGS. 1 and/or 3 can (1) add, replace, and/or remove one of the features 400 and/or (2) update one(s) of the weight values. For example, the executable generator 340 can use artificial intelligence (AI), including machine learning (ML), deep learning (DL), and/or other artificial machine-driven logic. In such examples, the executable generator 340 can invoke computer(s), computing system(s), logic circuit(s), etc.) to use model(s) to process input data (e.g., the third reference fingerprint(s) 140, the telemetry data 380, etc.) to generate an output (e.g., one(s) of the features 400, one(s) of the weight values, etc., and/or a combination thereof) based on patterns and/or associations previously learned by the model via a training process. For instance, the model can be trained with data to recognize patterns and/or associations and follow such patterns and/or associations when processing input data such that other input(s) result in output(s) consistent with the recognized patterns and/or associations.

Figure 5:
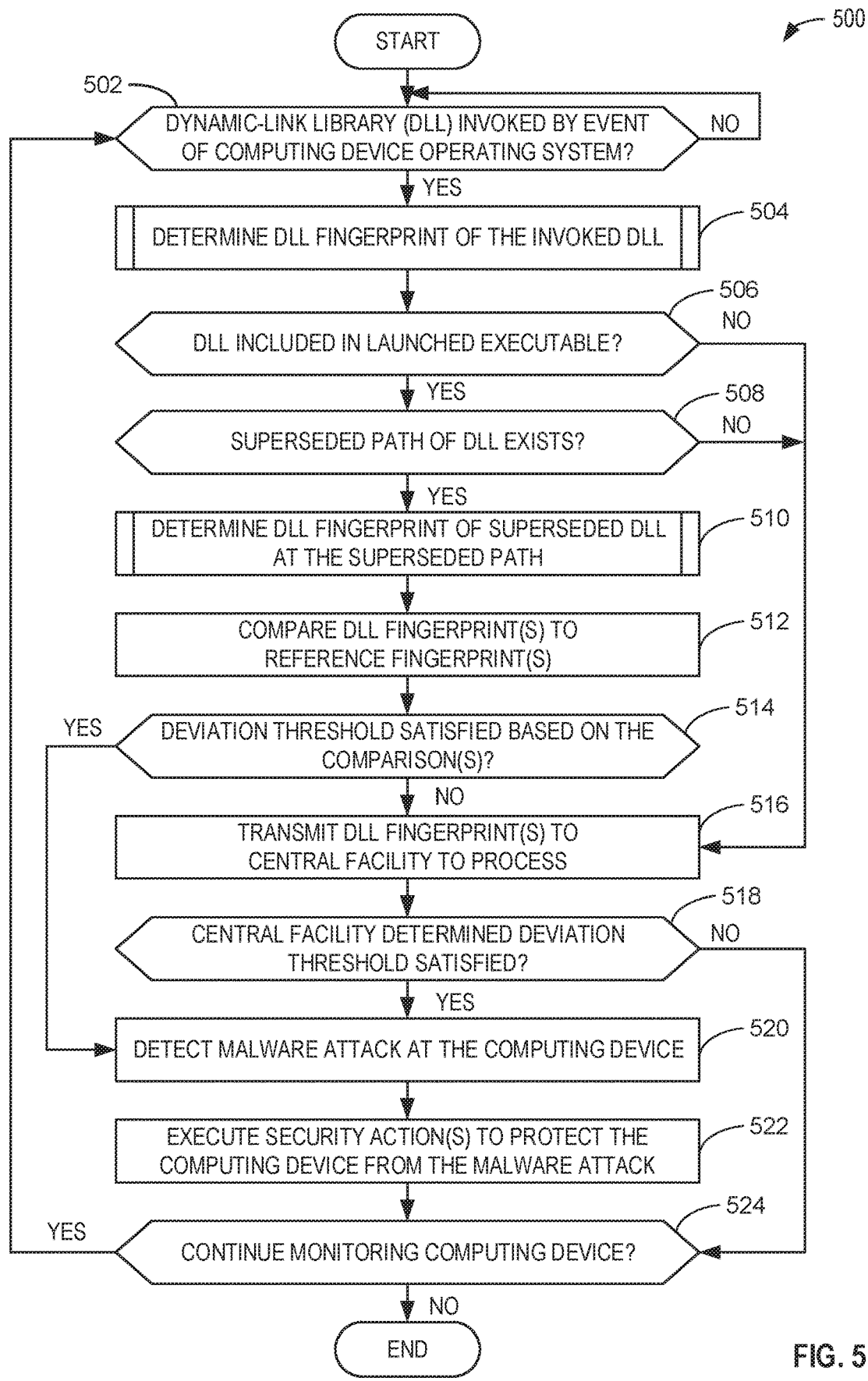
FIG. 5 is a flowchart representative of example machine readable instructions that may be executed to implement the example DLL security controller of FIGS. 1 and/or 2 to execute security action(s) in response to identifying a malware attack.
Figure 6:
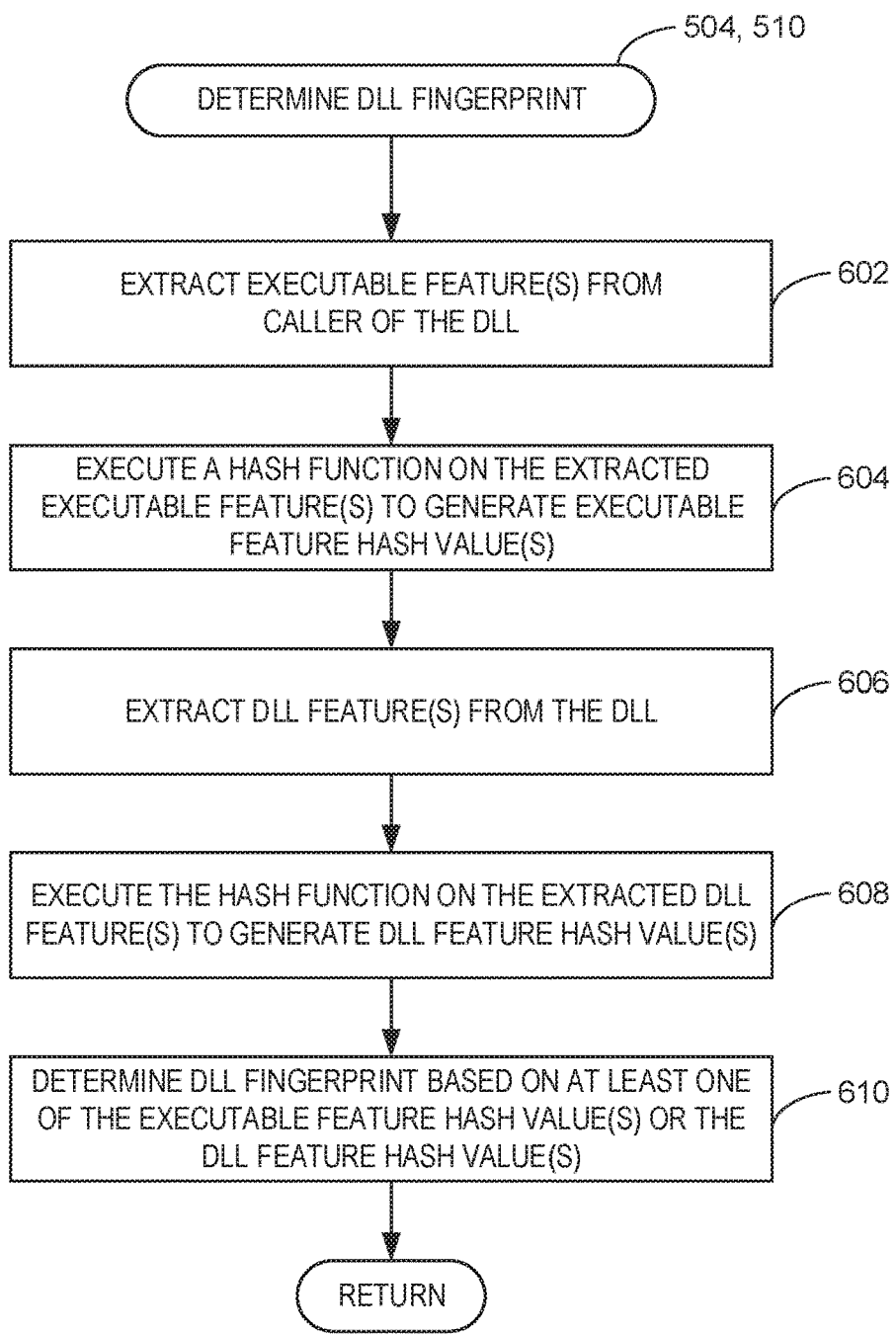
FIG. 6 is a flowchart representative of example machine readable instructions that may be executed to implement the example DLL security controller of FIGS. 1 and/or 2 to determine a DLL fingerprint.

Flowcharts representative of example hardware logic, machine readable instructions, hardware implemented state machines, and/or any combination thereof for implementing the DLL security controller(s) 102, 104 of FIGS. 1 and/or 2 are shown in FIGS. 5-6. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-6, many other methods of implementing the example DLL security controller(s) 102, 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 7:
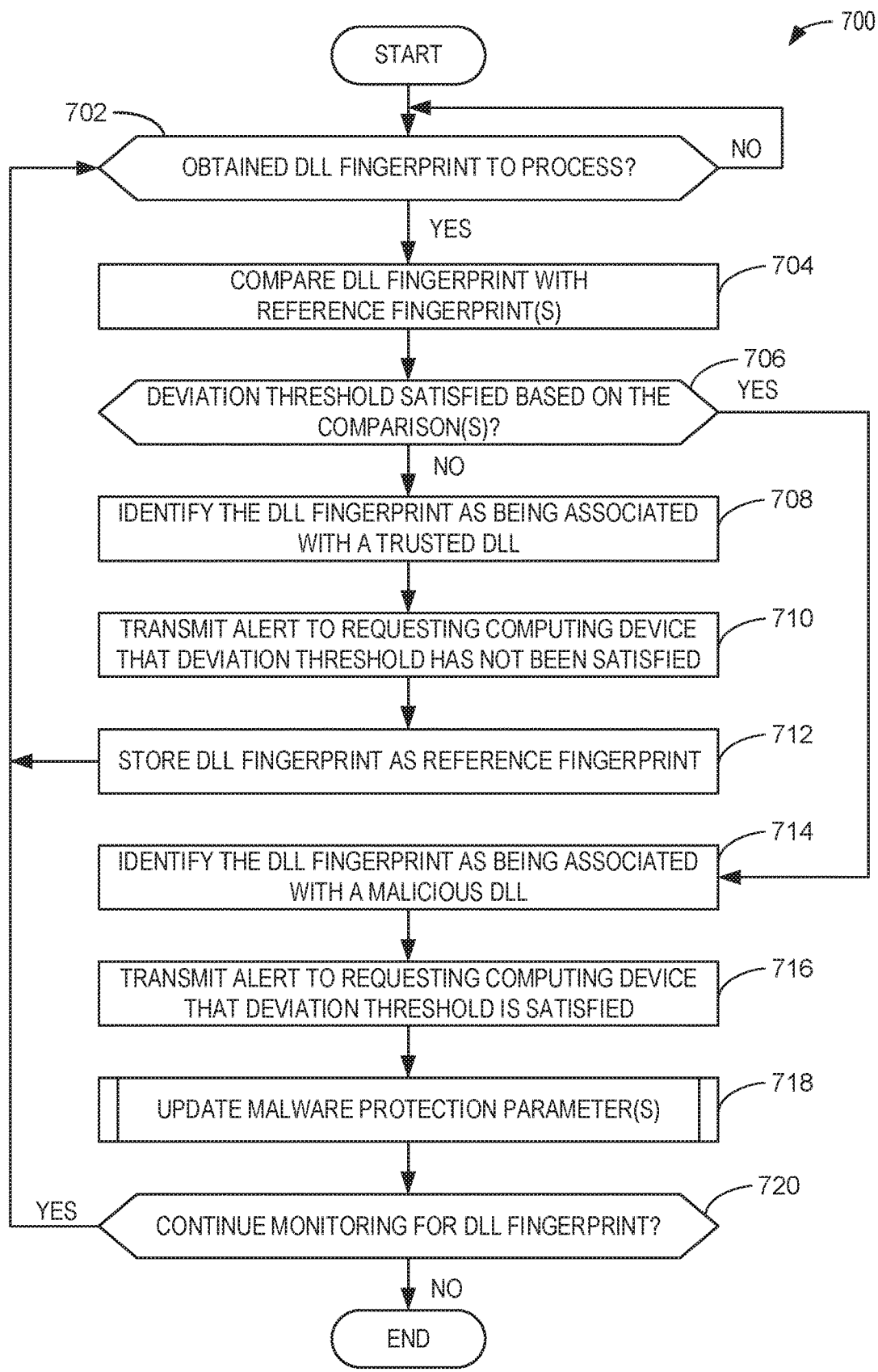
FIG. 7 is a flowchart representative of example machine readable instructions that may be executed to implement the example central facility of FIGS. 1 and/or 3 to identify a malware attack.
Figure 8:
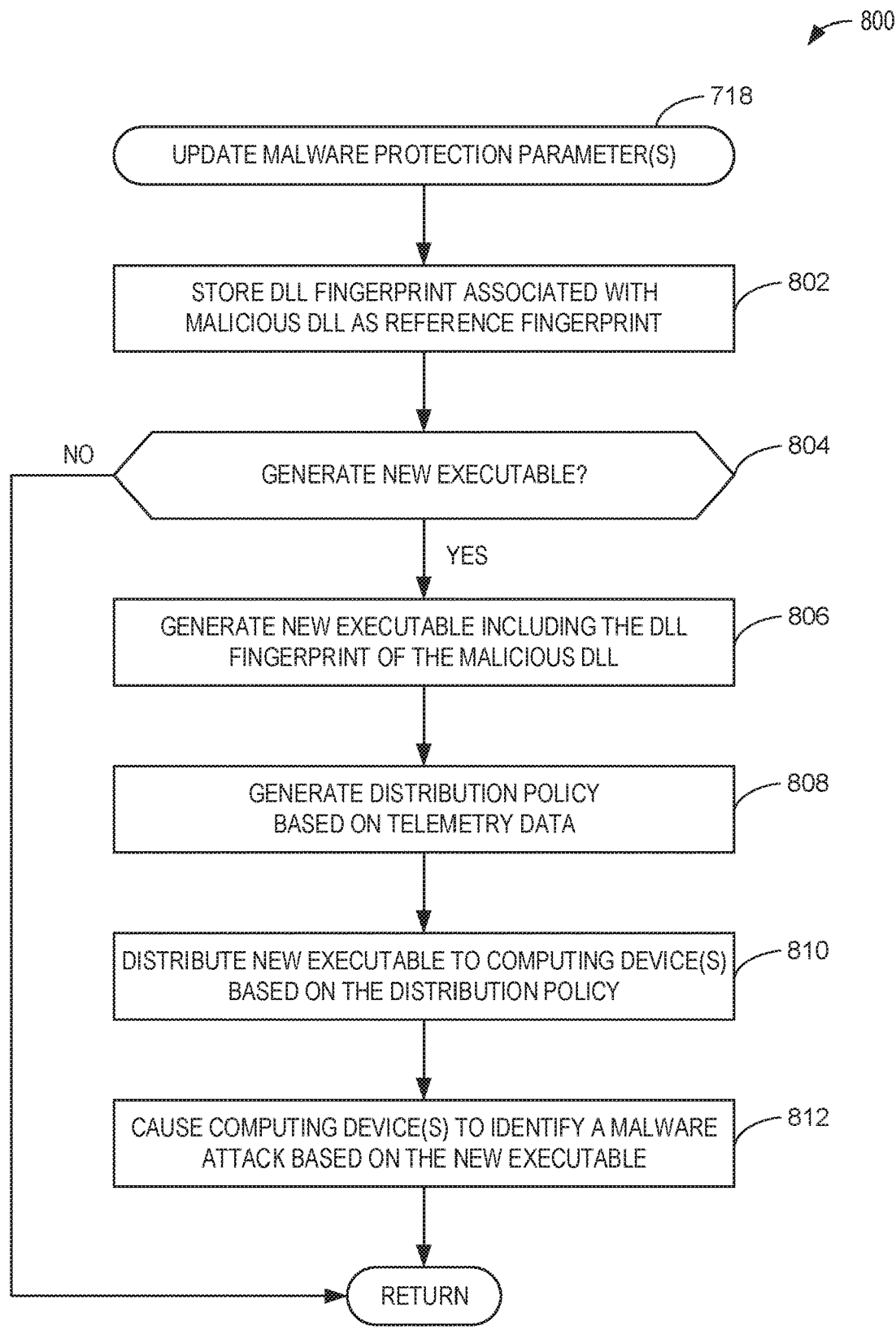
FIG. 8 is a flowchart representative of example machine readable instructions that may be executed to implement the example central facility of FIGS. 1 and/or 3 to update example malware protection parameter(s).

Flowcharts representative of example hardware logic, machine readable instructions, hardware implemented state machines, and/or any combination thereof for implementing the central facility 106 of FIGS. 1 and/or 3 are shown in FIGS. 7-8. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7-8, many other methods of implementing the example central facility 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a DLL), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HTML, SQL, Swift, etc.

As mentioned above, the example processes of FIGS. 5-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 that may be executed to implement the DLL security controller(s) 102, 104 of FIGS. 1 and/or 2 to execute security action(s) in response to identifying a malware attack. The machine readable instructions 500 of FIG. 5 begin at block 502, at which the DLL security controller(s) 102, 104 determine whether a DLL has been invoked by an event of a computing device operation system. For example, the event monitor 210 (FIG. 2) can determine that an OS event has been created in response to the second file 134 (FIG. 1) being invoked by the application 124 (FIG. 1), loaded by the DLL loader 116 (FIG. 1), etc.

If, at block 502, the DLL security controller(s) 102, 104 determine that a DLL has not been invoked by an event of the computing device operating system, control waits to be initiated, triggered, etc., at block 502 by an event. If, at block 502, the DLL security controller(s) 102, 104 determine that a DLL has been invoked by an event of the computing device operating system, then, at block 504, the DLL security controller(s) 102, 104 determine a DLL fingerprint of the invoked DLL. For example, the fingerprint generator 230 (FIG. 2) can generate a DLL fingerprint based on the second file 134. Example instructions that may be executed to implement block 504 are described below in connection with FIG. 6.

At block 506, the DLL security controller(s) 102, 104 determine whether the DLL is included in a launched executable. For example, the DLL path determiner 220 (FIG. 2) can determine whether the second file 134 is included in the application 124, in a local path of the application 124, etc.

If, at block 506, the DLL security controller(s) 102, 104 determine that the DLL is not included in the launched executable, control proceeds to block 516 to transmit DLL fingerprint(s) to the central facility 106 (FIGS. 1 and/or 3) to process. For example, the DLL path determiner 220 can determine that a superseded path of the second file 134 does not exist.

If, at block 506, the DLL security controller(s) 102, 104 determine that the DLL is included in the launched executable, then, at block 508, the DLL security controller(s) 102, 104 determine whether a superseded path of the DLL exists. For example, the DLL path determiner 220 can determine that a superseded path of the second file 134 may exist in response to determining that the second file 134 is included in the application 124, a local path of the application 124, etc.

If, at block 508, the DLL security controller(s) 102, 104 determine that the superseded path of the DLL does not exist, control proceeds to block 516 to transmit DLL fingerprint(s) to the central facility 106 to process. For example, the DLL path determiner 220 can determine that a superseded path of the second file 134 does not exist.

If, at block 508, the DLL security controller(s) 102, 104 determine that the superseded path of the DLL does exist, then, at block 510, the DLL security controller(s) 102, 104 determine a DLL fingerprint of a superseded DLL at the superseded path. For example, the fingerprint generator 230 can generate a DLL fingerprint (e.g., a superseded DLL fingerprint) based on the second file 134, where the second file 134 can be stored at the superseded path. Example instructions that may be executed to implement block 510 are described below in connection with FIG. 6.

At block 512, the DLL security controller(s) 102, 104 compare DLL fingerprint(s) to reference fingerprint(s). For example, the fingerprint comparator 240 (FIG. 2) can compare one(s) of the DLL fingerprint, the superseded DLL fingerprint, etc., to one(s) of the first reference fingerprint(s) 136 (FIG. 1). In such examples, the fingerprint comparator 240 can execute the comparison by calculating and/or otherwise determining a Hamming distance between (1) the DLL fingerprint based on the second file 134 and (2) a first one of the first reference fingerprint(s) 136.

At block 514, the DLL security controller(s) 102, 104 determines whether a deviation threshold has been satisfied based on the comparison(s). For example, the fingerprint comparator 240 can determine that the difference (e.g., the Hamming distance) between the DLL fingerprint based on the second file 134 and the first one of the first reference fingerprint(s) 136 satisfies a deviation threshold. In such examples, the fingerprint comparator 240 can determine that the difference satisfies the deviation threshold in response to the difference being greater than the deviation threshold.

If, at block 514, the DLL security controller(s) 102, 104 determines that the deviation threshold has been satisfied based on the comparison(s), control proceeds to block 520 to detect a malware attack at the computing device. For example, the security action enforcer 260 (FIG. 2) can determine that the second file 134, and/or, more generally, the application 124, is associated with a malware attack at the first computing device 108 based on the deviation threshold being satisfied.

If, at block 514, the DLL security controller(s) 102, 104 determines that the deviation threshold has not been satisfied based on the comparison(s), then, at block 516, the DLL security controller(s) 102, 104 transmit DLL fingerprint(s) to the central facility 106 to process. For example, the telemetry interface 250 (FIG. 2) can transmit the DLL fingerprint, the superseded DLL fingerprint, etc., to the central facility 106 for comparison to the third reference fingerprint(s) 140 (FIGS. 1 and/or 3).

At block 518, the DLL security controller(s) 102, 104 determine whether a central facility determined a deviation threshold has been satisfied. For example, in response to transmitting DLL fingerprint(s) to the central facility 106, the telemetry interface 250 can obtain an alert from the central facility 106 indicative of one of the transmitted DLL fingerprint(s) either being associated with a malicious DLL or a trusted DLL. In such examples, the security action enforcer 260 can determine that the central facility 106 determined that a deviation threshold has been satisfied based on the alert being indicative of the malicious DLL.

If, at block 518, the DLL security controller(s) 102, 104 determines that the central facility 106 did not determine a deviation threshold has been satisfied, control proceeds to block 524 to determine whether to continue monitoring the computing device. If, at block 518, the DLL security controller(s) 102, 104 determines that the central facility 106 determined that a deviation threshold has been satisfied, then, at block 520, the DLL security controller(s) 102, 104 detect a malware attack at the computing device. For example, the security action enforcer 260 can determine that the alert obtained from the central facility 106 indicates that one or more of the transmitted DLL fingerprint(s) are associated with a malware attack.

At block 522, the DLL security controller(s) 102, 104 execute security action(s) to protect the computing device from the malware attack. For example, the security action enforcer 260 can unload the second file 134 from memory, terminate execution of the application 124, etc., and/or generate a log including information associated with actions, tasks, etc., executed by the security action enforcer 260. In some examples, the security action enforcer 260 can invoke the telemetry interface 250 to transmit the log to the central facility 106 to improve malware protection by updating the executable(s) 142 (FIG. 1) based on the information included in the log.

At block 524, the DLL security controller(s) 102, 104 determine whether to continue monitoring the computing device. For example, the event monitor 210 can determine whether to continue monitoring the OS 112 of the first computing device 108 for an event (e.g., a creation event). If, at block 524, the DLL security controller(s) 102, 104 determine to continue monitoring the computing device, control returns to block 502 to determine whether a DLL has been invoked by an event of the computing device operating system. If, at block 524, the DLL security controller(s) 102, 104 determine not to continue monitoring the computing device, the machine readable instructions 500 of FIG. 5 terminate.

FIG. 6 is a flowchart representative of example machine readable instructions 600 that may be executed to implement the DLL security controller(s) 102, 104 of FIGS. 1 and/or 2 to determine a DLL fingerprint. The example machine readable instructions 600 of FIG. 6 can be executed to implement block 504 and/or block 510 of FIG. 5. The machine readable instructions 600 of FIG. 6 begin at block 602, at which the DLL security controller(s) 102, 104 extract executable feature(s) from a caller of the DLL. For example, the fingerprint generator 230 (FIG. 2) can extract one or more of the executable features 410 (FIG. 4) from the application 124 (FIG. 1) that called or invoked the second file 134 (FIG. 1).

At block 604, the DLL security controller(s) 102, 104 execute a hash function on the extracted executable feature(s) to generate executable feature hash value(s). For example, the fingerprint generator 230 can execute a CRC hash function, algorithm, etc., on one or more of the executable features 410 extracted from the application 124 to generate one or more respective executable feature hash values.

At block 606, the DLL security controller(s) 102, 104 extract DLL feature(s) from the DLL. For example, the fingerprint generator 230 (FIG. 2) can extract one or more of the DLL features 420 (FIG. 4) from the second file 134.

At block 608, the DLL security controller(s) 102, 104 execute a hash function on the extracted DLL feature(s) to generate DLL feature hash value(s). For example, the fingerprint generator 230 can execute a CRC hash function, algorithm, etc., on one or more of the DLL features 420 extracted from the second file 134 to generate one or more respective DLL feature hash values.

At block 610, the DLL security controller(s) 102, 104 determine a DLL fingerprint based on at least one of the executable feature hash value(s) or the DLL feature hash value(s). For example, the fingerprint generator 230 can generate a DLL fingerprint based on at least one of (1) one or more of the executable feature hash values or (2) one or more of the DLL feature hash values. In such examples, the fingerprint generator 230 can concatenate one or more portions, one or more bit strings, etc., corresponding to respective one(s) of the executable feature hash values, the DLL feature hash values, etc., to generate the DLL fingerprint. For example, the fingerprint generator 230 can generate the DLL fingerprint to include a first bit string that includes one or more second bit strings, where each of the second bit strings corresponds to one of executable feature hash values or the DLL feature hash values. In response to determining the DLL fingerprint based on at least one of the executable feature hash value(s) or the DLL feature hash value(s) at block 610, control returns to block 506 or block 512 of the machine readable instructions 500 of FIG. 5.

FIG. 7 is a flowchart representative of example machine readable instructions 700 that may be executed to implement the central facility 106 of FIGS. 1 and/or 3 to identify a malware attack. The machine readable instructions 700 of FIG. 7 begin at block 702, at which the central facility 106 determines whether the central facility 106 obtained a DLL fingerprint to process. For example, the network interface 310 (FIG. 3) can determine that a DLL fingerprint has been obtained from the first computing device 108 (FIG. 1).

If, at block 702, the central facility 106 determines that a DLL fingerprint has not been obtained, control waits at block 702 to be initiated, triggered, etc., by obtaining a DLL fingerprint. If, at block 702, the central facility 106 determines that a DLL fingerprint has been obtained, then, at block 704, the central facility 106 compares the DLL fingerprint with reference fingerprint(s). For example, the fingerprint comparator 320 (FIG. 3) can compare the DLL fingerprint to one(s) of the third reference fingerprint(s) 140 (FIGS. 1 and/or 3).

At block 706, the central facility 106 determines whether a deviation threshold has been satisfied based on the comparison(s). For example, the fingerprint comparator 320 can determine that difference(s) (e.g., a Hamming distance) between the DLL fingerprint based on the second file 134 and one(s) of the third reference fingerprint(s) 140 satisfy a deviation threshold. In such examples, the fingerprint comparator 320 can determine that one or more of the difference(s) satisfy the deviation threshold in response to the one or more of the difference(s) being greater than the deviation threshold.

If, at block 706, the central facility 106 determines that the deviation threshold has not been satisfied based on the comparison(s), then, at block 708, the central facility 106 identifies the DLL fingerprint as being associated with a trusted DLL. For example, the fingerprint comparator 320 can determine that the second file 134 is a trusted DLL in response to the deviation threshold not being satisfied.

At block 710, the central facility 106 transmits an alert to a requesting computing device that the deviation threshold has not been satisfied. For example, the alert generator 330 (FIG. 3) can generate an alert indicative of the DLL fingerprint being associated with a trusted DLL (e.g., the DLL fingerprint not being associated with a malware exploit). In such examples, the alert generator 330 can invoke the network interface 310 to transmit the alert to the computing device that transmitted the DLL fingerprint to the central facility 106, such as the first computing device 108.

At block 712, the central facility 106 stores the DLL fingerprint as a reference fingerprint. For example, the fingerprint comparator 320 can store the DLL fingerprint as one of the third reference fingerprint(s) 140 in the database 370 (FIG. 3). In such examples, the fingerprint comparator 320 can store an association in the database 370 between the DLL fingerprint and an identifier, a machine readable flag, etc., representative of the DLL fingerprint being associated with a trusted DLL.

If, at block 706, the central facility 106 determines that the deviation threshold has been satisfied based on the comparison(s), control proceeds to block 714 to identify the DLL fingerprint as being associated with a malicious DLL. For example, the fingerprint comparator 320 can determine that the DLL fingerprint obtained from the first computing device 108 is associated with a malware attack At block 716, the central facility 106 transmits an alert to a requesting computing device that the deviation threshold has been satisfied. For example, the alert generator 330 can generate an alert indicative of the DLL fingerprint being associated with a malicious DLL (e.g., the DLL fingerprint being associated with a malware exploit). In such examples, the alert generator 330 can invoke the network interface 310 to transmit the alert to the computing device that transmitted the DLL fingerprint to the central facility 106, such as the first computing device 108.

At block 718, the central facility 106 can update malware protection parameter(s). For example, the executable generator 340 (FIG. 3) can generate one(s) of the executable(s) 142 (FIGS. 1 and/or 3) by including the DLL fingerprint, updating one or more weight values depicted in FIG. 4, etc. Example instructions that may be executed to implement block 718 are described below in connection with FIG. 8.

At block 720, the central facility 106 determines whether to continue monitoring for a DLL fingerprint. For example, the network interface 310 can determine whether to continue monitoring a DLL fingerprint from one(s) of the computing device(s) 108, 110 (FIG. 1). If, at block 720, the central facility 106 determines to continue monitoring for a DLL fingerprint, control returns to block 702 to determine whether another DLL fingerprint has been obtained to process. If, at block 720, the central facility 106 determines not to continue monitoring for a DLL fingerprint, the machine readable instructions 700 of FIG. 7 terminate.

FIG. 8 is a flowchart representative of example machine readable instructions 800 that may be executed to implement the central facility 106 of FIGS. 1 and/or 3 to update malware protection parameter(s). The example machine readable instructions 800 of FIG. 8 can be executed to implement block 718 of FIG. 7. The machine readable instructions 800 of FIG. 8 begin at block 802, at which the central facility 106 stores a DLL fingerprint associated with a malicious DLL as a reference fingerprint. For example, the fingerprint comparator 320 (FIG. 3) can store the DLL fingerprint based on the second file 134 (FIG. 1) as one of the third reference fingerprint(s) 140 (FIGS. 1 and/or 3). In such examples, the fingerprint comparator 320 can store an association in the database 370 between the DLL fingerprint and an identifier, a machine readable flag, etc., representative of the DLL fingerprint being associated with a malicious DLL.

At block 804, the central facility 106 determines whether to generate a new executable. For example, the executable generator 340 (FIG. 3) can determine to generate new one(s) of the executable(s) 142 in response to one or more DLL fingerprints being added to the database 370, after a specified time duration (e.g., a week, a month, a year, etc.) has elapsed.

If, at block 804, the central facility 106 determines not to generate a new executable, control returns to block 720 of the machine readable instructions 700 of FIG. 7 to determine whether to continue monitoring for a DLL fingerprint. If, at block 804, the central facility 106 determines to generate a new executable, then, at block 806, the central facility 106 generates a new executable including the DLL fingerprint of the malicious DLL. For example, the executable generator 340 can generate one(s) of the executable(s) 142 by including the DLL fingerprint based on the second file 134 in the one(s) of the executable(s) 142.

At block 808, the central facility 106 generates a distribution policy based on telemetry data. For example, the telemetry aggregator 350 (FIG. 3) can generate the distribution policy 375 (FIG. 3) based on the telemetry data 380 obtained from one(s) of the computing device(s) 108, 110 (FIG. 1). In such examples, the telemetry aggregator 350 can generate the distribution policy 375 to include identification(s) of one(s) of the computing device(s) 108, 110 to transmit one(s) of the executable(s) 142 to upgrade respective one(s) of the DLL security controllers 102, 104 (FIG. 1).

At block 810, the central facility 106 distributes the new executable to computing device(s) based on the distribution policy. For example, the executable distributor 360 can identify one(s) of the computing device(s) 108, 110 to upgrade based on the distribution policy 375. In such examples, the executable distributor 360 can invoke the network interface 310 (FIG. 3) to transmit the executable(s) 142 to the identified one(s) of the computing device(s) 108, 110 to upgrade the identified one(s) of the computing device(s) 108, 110. For example, the DLL security controller(s) 102, 104 of the identified one(s) of the computing device(s) 108, 110 can be upgraded in response to the identified one(s) of the computing device(s) 108, 110 installing and/or otherwise invoking the received one(s) of the executable(s) 142.

At block 812, the central facility 106 causes computing device(s) to identify a malware attack based on the new executable. For example, the executable distributor 360 can cause the upgraded one(s) of the computing device(s) 108, 110 to identify a malware attack by executing an upgraded version of the DLL security controllers 102, 104. In such examples, the upgrade DLL security controller(s) 102, 104 can replace the first reference fingerprint(s) 136, the second reference fingerprint(s) 138, etc., with the third reference fingerprint(s) 140. In response to causing the computing device(s) to identify a malware attack based on the new executable at block 812, control returns to block 720 of the machine readable instructions 700 of FIG. 7 to determine whether to continue monitoring for a DLL fingerprint.

Figure 9:
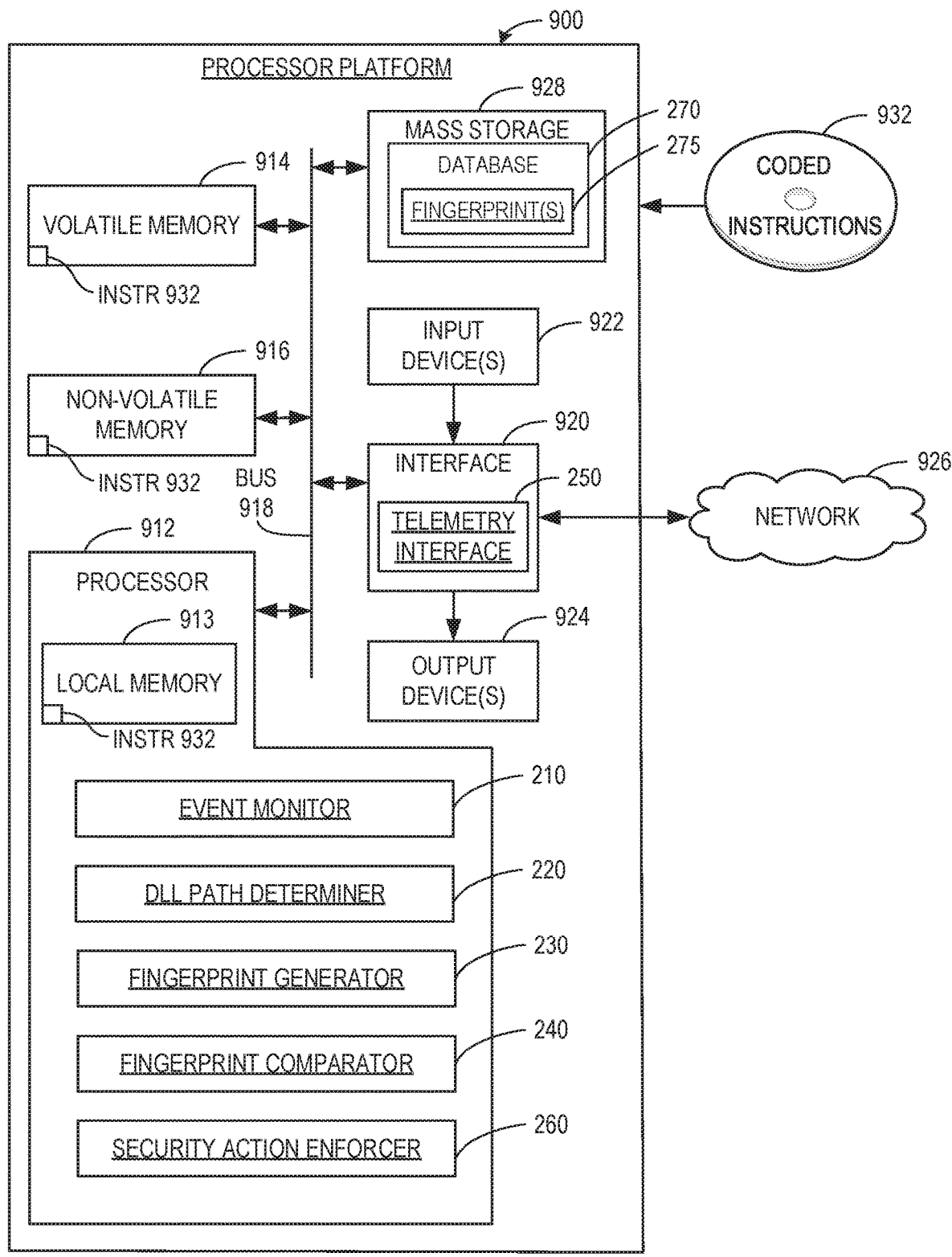
FIG. 9 is a block diagram of an example processing platform structured to execute the instructions of FIGS. 5 and/or 6 to implement the example DLL security controller of FIGS. 1 and/or 2.

FIG. 9 is a block diagram of an example processor platform 900 structured to execute the instructions of FIGS. 5-6 to implement the first DLL security controller 102 and/or one(s) of the second DLL security controllers 104 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), a gaming console, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example event monitor 210, the example DLL path determiner 220, the example fingerprint generator 230, the example fingerprint comparator 240, and the example security action enforcer 260 of FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by SDRAM, DRAM, RDRAM®, and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC)

interface, and/or a PCI express interface. In this example, the interface circuit 920 implements the example telemetry interface 250 of FIG. 2.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and DVD drives. In this example, the one or more mass storage devices 928 implements the example database 270 and the example fingerprint(s) 275 of FIG. 2.

The machine executable instructions 932 of FIGS. 5-6 may be stored in the mass storage device 928, in the volatile memory 914, in the non-volatile memory 916, and/or on a removable non-transitory computer readable storage medium such as a CD or DVD.

Figure 10:
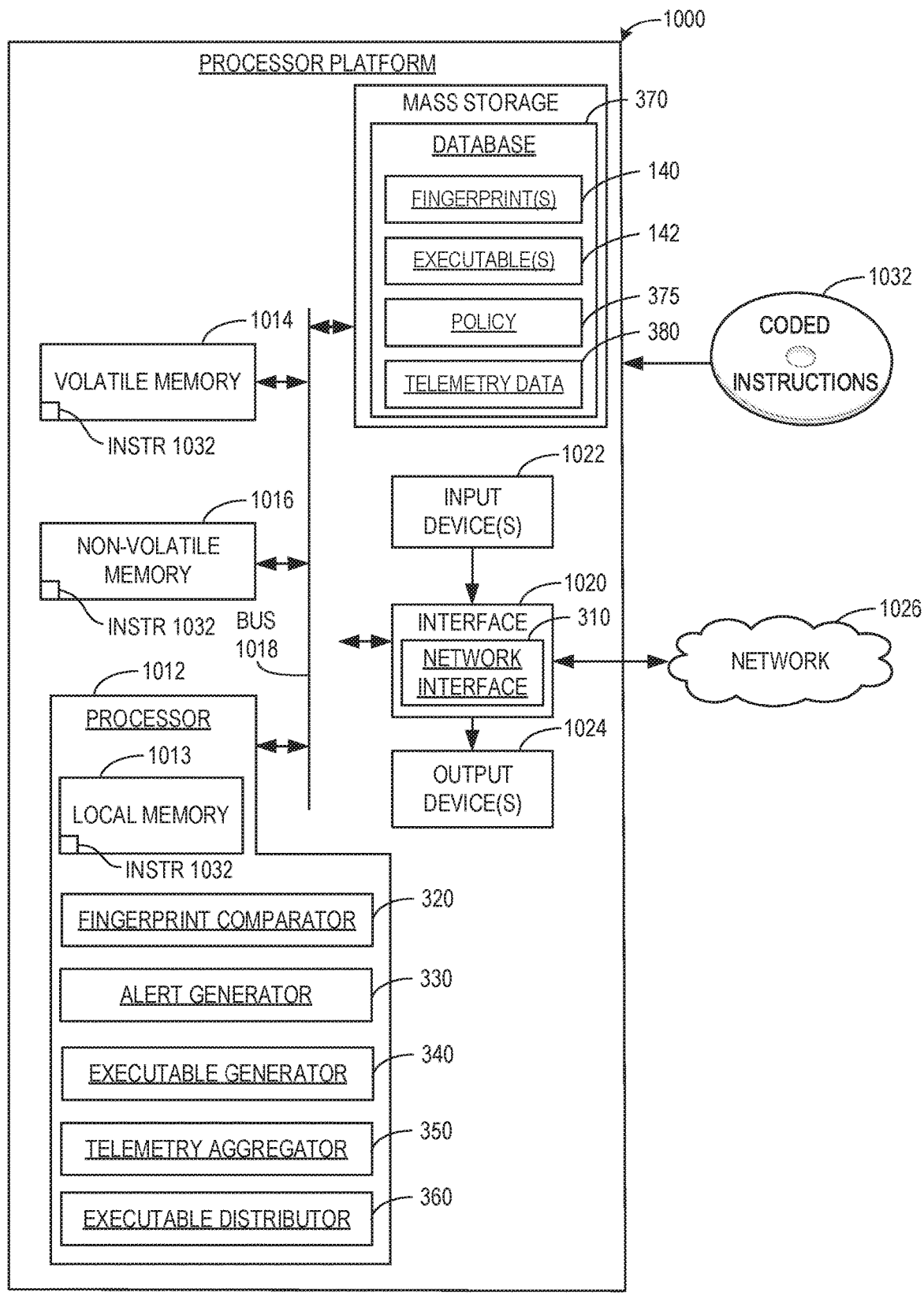
FIG. 10 is a block diagram of an example processing platform structured to execute the instructions of FIGS. 7 and/or 8 to implement the example central facility of FIGS. 1 and/or 3.

FIG. 10 is a block diagram of an example processor platform 1000 structured to execute the instructions of FIGS. 7-8 to implement the central facility 106 of FIGS. 1 and/or 3. The processor platform 1000 can be, for example a server, a personal computer, a workstation, a self-learning machine (e.g., a neural network), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example fingerprint comparator 320, the example alert generator 330, the example executable generator 340, the example telemetry aggregator 350, and the example executable distributor 360 of FIG. 3.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by SDRAM, DRAM, RDRAM®, and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, a Bluetooth® interface, an NFC interface, and/or a PCI express interface. In this example, the interface circuit 1020 implements the example network interface 310 of FIG. 3.

In the illustrated example, one or more input devices 1022 are connected to the interface circuit 1020. The input device(s) 1022 permit(s) a user to enter data and/or commands into the processor 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1020 of the illustrated example. The output devices 1024 can be implemented, for example, by display devices (e.g., an LED, an OLED, an LCD, a CRT display, an IPS display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a DSL connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives. In this example, the one or more mass storage devices 1028 implement the example database 370, the third example reference fingerprint(s) 140, the example executable(s) 142, the example policy 375, and the example telemetry data 380 of FIG. 3.

The machine executable instructions 1032 of FIGS. 7-8 may be stored in the mass storage device 1028, in the volatile memory 1014, in the non-volatile memory 1016, and/or on a removable non-transitory computer readable storage medium such as a CD or DVD.

From the foregoing, it will be appreciated that example systems, methods, apparatus, and articles of manufacture have been disclosed that defend against malware attacks, such as DLL side-loading attacks. The disclosed systems, methods, and articles of manufacture generate a fingerprint associated with an invoked DLL and/or the executable that calls the invoked DLL. The disclosed systems, methods, and articles of manufacture can detect a DLL side-loading attack in response to the fingerprint satisfying a deviation threshold indicative of the invoked DLL being associated with the DLL side-loading attack or any other type of computer attack or exploit.

Advantageously, the disclosed systems, methods, and articles of manufacture can transmit the fingerprint to external computing device(s) (e.g., one or more computing servers) to leverage an increased capacity of hardware and/or software resources of the external computing device(s) to detect a malware attack by comparing the fingerprint to a plurality of reference fingerprints obtained by a plurality of computing devices. Advantageously, the disclosed systems, methods, apparatus, and articles of manufacture improve the efficiency of using a computing device by offloading fingerprint comparison(s) to the external computing device(s). Advantageously, the disclosed systems, methods, apparatus, and articles of manufacture improve availability of a computing device by defending the computing device from attacks, exploits, etc., not yet encountered by the computing device. The disclosed methods, apparatus and articles of manufacture are accordingly directed to one or more improvement(s) in the functioning of a computer.

Further examples and combinations thereof include the following:

Example 1 includes an apparatus to detect an attack at a computing device, the apparatus comprising a fingerprint generator to determine a first dynamic-link library (DLL) fingerprint of a first DLL referenced by an operating system (OS) event, the OS event generated by the computing device, the first DLL stored at a first OS path, and in response to determining that a second DLL is stored at a second OS path, determine a second DLL fingerprint of the second DLL, the second DLL having the same name as the first DLL, the second OS path superseding the first OS path, a fingerprint comparator to determine whether at least one of the first DLL fingerprint or the second DLL fingerprint satisfies a deviation threshold based on a comparison of the first DLL fingerprint and the second DLL fingerprint to a reference DLL fingerprint, and a security action enforcer to execute a security action to protect the computing device from the attack in response to the deviation threshold being satisfied.

Example 2 includes the apparatus of example 1, wherein the OS event includes launching an executable by the computing device, the second OS path is a side-by-side assembly path, and further including a DLL path determiner to determine whether the first DLL is included in the executable, and in response to determining that the first DLL is included in the executable, determine whether the second DLL is stored at the second OS path.

Example 3 includes the apparatus of example 1, wherein the reference DLL fingerprint is a first reference fingerprint, further including a telemetry interface to transmit the first DLL to a server, and in response to obtaining an alert from the server, the security action enforcer is to execute the security action, the alert indicative of the server determining that the first DLL satisfied the deviation threshold based on a comparison of the first DLL to a second reference fingerprint, the second reference fingerprint different from the first reference fingerprint.

Example 4 includes the apparatus of example 1, wherein the security action includes at least one of generating a log, blocking a first execution of at least one of the first DLL or the second DLL, or preventing a second execution of an executable that triggered the OS event.

Example 5 includes the apparatus of example 1, wherein the fingerprint generator is to extract a feature from the first DLL, execute a hash algorithm on the feature to generate a hash value, and determine the first DLL fingerprint based on the hash value.

Example 6 includes the apparatus of example 5, wherein the feature is a first feature, the hash value is a first hash value, and the fingerprint generator is to in response to determining that an executable triggered the OS event, extract a second feature from the executable, execute the hash algorithm on the second feature to generate a second hash value, and determine the first DLL fingerprint based on at least one of the first hash value or the second hash value.

Example 7 includes the apparatus of example 5, wherein the feature is the first OS path, a list of exported functions associated with the first DLL, digital signature information, a high-level language used to generate the first DLL, a compiler that compiled the first DLL, or a file version of the first DLL.

Example 8 includes At least one non-transitory computer readable storage medium comprising instructions that, when executed, cause at least one processor to at least determine a first dynamic-link library (DLL) fingerprint of a first DLL referenced by an operating system (OS) event, the OS event generated by a computing device, the first DLL stored at a first OS path, in response to determining that a second DLL is stored at a second OS path, determine a second DLL fingerprint of the second DLL, the second DLL having the same name as the first DLL, the second OS path superseding the first OS path, determine whether at least one of the first DLL fingerprint or the second DLL fingerprint satisfies a deviation threshold based on a comparison of the first DLL fingerprint and the second DLL fingerprint to a reference DLL fingerprint, and execute a security action to protect the computing device from an attack in response to the deviation threshold being satisfied.

Example 9 includes the at least one non-transitory computer readable storage medium of example 8, wherein the OS event includes launching an executable by the computing device, the second OS path is a side-by-side assembly path, and the instructions, when executed, cause the at least one processor to determine whether the first DLL is included in the executable, and in response to determining that the first DLL is included in the executable, determining whether the second DLL is stored at the second OS path.

Example 10 includes the at least one non-transitory computer readable storage medium of example 8, wherein the reference DLL fingerprint is a first reference fingerprint, and the instructions, when executed, cause the at least one processor to transmit the first DLL to a server, and in response to obtaining an alert from the server, execute the security action, the alert indicative of the server determining that the first DLL satisfied the deviation threshold based on a comparison of the first DLL to a second reference fingerprint, the second reference fingerprint different from the first reference fingerprint.

Example 11 includes the at least one non-transitory computer readable storage medium of example 8, wherein the security action includes at least one of generating a log, blocking a first execution of at least one of the first DLL or the second DLL, or preventing a second execution of an executable that triggered the OS event.

Example 12 includes the at least one non-transitory computer readable storage medium of example 8, wherein the instructions, when executed, cause the at least one processor to extract a feature from the first DLL, execute a hash algorithm on the feature to generate a hash value, and determine the first DLL fingerprint based on the hash value.

Example 13 includes the at least one non-transitory computer readable storage medium of example 12, wherein the feature is a first feature, the hash value is a first hash value, and the instructions, when executed, cause the computing device to in response to determining that an executable triggered the OS event, extract a second feature from the executable, execute the hash algorithm on the second feature to generate a second hash value, and determine the first DLL fingerprint based on at least one of the first hash value or the second hash value.

Example 14 includes the at least one non-transitory computer readable storage medium of example 12, wherein the feature is the first OS path, a list of exported functions associated with the first DLL, digital signature information, a high-level language used to generate the first DLL, a compiler that compiled the first DLL, or a file version of the first DLL.

Example 15 includes an apparatus to detect an attack at a computing device, the apparatus comprising means for determining to determine a first dynamic-link library (DLL) fingerprint of a first DLL referenced by an operating system (OS) event, the OS event generated by the computing device, the first DLL stored at a first OS path, and in response to determining that a second DLL is stored at a second OS path, a second DLL fingerprint of the second DLL, the second DLL having the same name as the first DLL, the second OS path superseding the first OS path, means for comparing to compare the first DLL fingerprint and the second DLL fingerprint to a reference DLL fingerprint, and determine whether at least one of the first DLL fingerprint or the second DLL fingerprint satisfies a deviation threshold based on the comparison, and means for executing a security action to protect the computing device from the attack in response to the deviation threshold being satisfied.

Example 16 includes the apparatus of example 15, wherein the OS event includes launching an executable by the computing device, the second OS path is a side-by-side assembly path, the means for determining is first means for determining, and further including second means for determining to determine whether the first DLL is included in the executable, and in response to determining that the first DLL is included in the executable, determine whether the second DLL is stored at the second OS path.

Example 17 includes the apparatus of example 15, wherein the reference DLL fingerprint is a first reference fingerprint, and further including means for transmitting the first DLL to a server, wherein the means for executing is to, in response to obtaining an alert from the server, execute the security action, the alert indicative of the server determining that the first DLL satisfied the deviation threshold based on a comparison of the first DLL to a second reference fingerprint, the second reference fingerprint different from the first reference fingerprint.

Example 18 includes the apparatus of example 15, wherein the security action includes at least one of generating a log, blocking a first execution of at least one of the first DLL or the second DLL, or preventing a second execution of an executable that triggered the OS event.

Example 19 includes the apparatus of example 15, wherein the means for determining is to extract a feature from the first DLL, execute a hash algorithm on the feature to generate a hash value, and determine the first DLL fingerprint based on the hash value.

Example 20 includes the apparatus of example 19, wherein the feature is a first feature, the hash value is a first hash value, and the means for determining is to in response to determining that an executable triggered the OS event, extract a second feature from the executable, execute the hash algorithm on the second feature to generate a second hash value, and determine the first DLL fingerprint based on at least one of the first hash value or the second hash value.

Example 21 includes the apparatus of example 19, wherein the feature is the first OS path, a list of exported functions associated with the first DLL, digital signature information, a high-level language used to generate the first DLL, a compiler that compiled the first DLL, or a file version of the first DLL.

Example 22 includes a method to detect an attack at a computing device, the method comprising determining a first dynamic-link library (DLL) fingerprint of a first DLL referenced by an operating system (OS) event, the OS event generated by the computing device, the first DLL stored at a first OS path, in response to determining that a second DLL is stored at a second OS path, determining a second DLL fingerprint of the second DLL, the second DLL having the same name as the first DLL, the second OS path superseding the first OS path, determining whether at least one of the first DLL fingerprint or the second DLL fingerprint satisfies a deviation threshold based on a comparison of the first DLL fingerprint and the second DLL fingerprint to a reference DLL fingerprint, and in response to the deviation threshold being satisfied, executing a security action to protect the computing device from the attack.

Example 23 includes the method of example 22, wherein the OS event includes launching an executable by the computing device, the second OS path is a side-by-side assembly path, and further including determining whether the first DLL is included in the executable, and in response to determining that the first DLL is included in the executable, determining whether the second DLL is stored at the second OS path.

Example 24 includes the method of example 22, wherein the reference DLL fingerprint is a first reference fingerprint, and further including transmitting the first DLL to a server, and in response to obtaining an alert from the server, executing the security action, the alert indicative of the server determining that the first DLL satisfied the deviation threshold based on a comparison of the first DLL to a second reference fingerprint, the second reference fingerprint different from the first reference fingerprint.

Example 25 includes the method of example 22, wherein the security action includes at least one of generating a log, blocking a first execution of at least one of the first DLL or the second DLL, or preventing a second execution of an executable that triggered the OS event.

Example 26 includes the method of example 22, further including extracting a feature from the first DLL, executing a hash algorithm on the feature to generate a hash value, and determine the first DLL fingerprint based on the hash value.

Example 27 includes the method of example 26, wherein the feature is a first feature, the hash value is a first hash value, and further including in response to determining that an executable triggered the OS event, extracting a second feature from the executable, executing the hash algorithm on the second feature to generate a second hash value, and determining the first DLL fingerprint based on at least one of the first hash value or the second hash value.

Example 28 includes the method of example 26, wherein the feature is the first OS path, a list of exported functions associated with the first DLL, digital signature information, a high-level language used to generate the first DLL, a compiler that compiled the first DLL, or a file version of the first DLL.

Although certain example systems, methods, apparatus and articles of manufacture have been disclosed herein, the scope of coverage of this patent is not limited thereto. On the contrary, this patent covers all systems, methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to detect an attack at a computing device, the apparatus comprising:
   a fingerprint generator to:
      determine a first dynamic-link library (DLL) fingerprint of a first DLL referenced by an operating system (OS) event, the OS event generated by the computing device, the first DLL stored at a first OS path; and
      in response to determining that a second DLL is stored at a second OS path, determine a second DLL fingerprint of the second DLL, the second DLL having the same name as the first DLL, the second OS path superseding the first OS path;
   a fingerprint comparator to determine whether at least one of the first DLL fingerprint or the second DLL fingerprint satisfies a deviation threshold based on a comparison of the first DLL fingerprint and the second DLL fingerprint to a reference DLL fingerprint; and
   a security action enforcer to execute a security action to protect the computing device from the attack in response to the deviation threshold being satisfied.

2. The apparatus of claim 1, wherein the OS event includes launching an executable by the computing device, the second OS path is a side-by-side assembly path, and further including a DLL path determiner to:
   determine whether the first DLL is included in the executable; and
   in response to determining that the first DLL is included in the executable, determine whether the second DLL is stored at the second OS path.

3. The apparatus of claim 1, wherein the reference DLL fingerprint is a first reference fingerprint, further including a telemetry interface to transmit the first DLL to a server, and in response to obtaining an alert from the server, the security action enforcer is to execute the security action, the alert indicative of the server determining that the first DLL satisfied the deviation threshold based on a comparison of the first DLL to a second reference fingerprint, the second reference fingerprint different from the first reference fingerprint.

4. The apparatus of claim 1, wherein the security action includes at least one of generating a log, blocking a first execution of at least one of the first DLL or the second DLL, or preventing a second execution of an executable that triggered the OS event.

5. The apparatus of claim 1, wherein the fingerprint generator is to:
   extract a feature from the first DLL;
   execute a hash algorithm on the feature to generate a hash value; and
   determine the first DLL fingerprint based on the hash value.

6. The apparatus of claim 5, wherein the feature is a first feature, the hash value is a first hash value, and the fingerprint generator is to:
   in response to determining that an executable triggered the OS event, extract a second feature from the executable;
   execute the hash algorithm on the second feature to generate a second hash value; and
   determine the first DLL fingerprint based on at least one of the first hash value or the second hash value.

7. The apparatus of claim 5, wherein the feature is at least one of the first OS path, a list of exported functions associated with the first DLL, digital signature information, a high-level language used to generate the first DLL, a compiler that compiled the first DLL, or a file version of the first DLL.

8. At least one non-transitory computer readable storage medium comprising instructions that, when executed, cause at least one processor to at least:
   determine a first dynamic-link library (DLL) fingerprint of a first DLL referenced by an operating system (OS) event, the OS event generated by a computing device, the first DLL stored at a first OS path;
   in response to determining that a second DLL is stored at a second OS path, determine a second DLL fingerprint of the second DLL, the second DLL having the same name as the first DLL, the second OS path superseding the first OS path;
   determine whether at least one of the first DLL fingerprint or the second DLL fingerprint satisfies a deviation threshold based on a comparison of the first DLL fingerprint and the second DLL fingerprint to a reference DLL fingerprint; and
   execute a security action to protect the computing device from an attack in response to the deviation threshold being satisfied.

9. The at least one non-transitory computer readable storage medium of claim 8, wherein the OS event includes launching an executable by the computing device, the second OS path is a side-by-side assembly path, and the instructions, when executed, cause the at least one processor to:
   determine whether the first DLL is included in the executable; and
   in response to determining that the first DLL is included in the executable, determining whether the second DLL is stored at the second OS path.

10. The at least one non-transitory computer readable storage medium of claim 8, wherein the reference DLL fingerprint is a first reference fingerprint, and the instructions, when executed, cause the at least one processor to:
   transmit the first DLL to a server; and
   in response to obtaining an alert from the server, execute the security action, the alert indicative of the server determining that the first DLL satisfied the deviation threshold based on a comparison of the first DLL to a second reference fingerprint, the second reference fingerprint different from the first reference fingerprint.

11. The at least one non-transitory computer readable storage medium of claim 8, wherein the security action includes at least one of generating a log, blocking a first execution of at least one of the first DLL or the second DLL, or preventing a second execution of an executable that triggered the OS event.

12. The at least one non-transitory computer readable storage medium of claim 8, wherein the instructions, when executed, cause the at least one processor to:
   extract a feature from the first DLL;
   execute a hash algorithm on the feature to generate a hash value; and determine the first DLL fingerprint based on the hash value.

13. The at least one non-transitory computer readable storage medium of claim 12, wherein the feature is a first feature, the hash value is a first hash value, and the instructions, when executed, cause the computing device to:
in response to determining that an executable triggered the OS event, extract a second feature from the executable;
execute the hash algorithm on the second feature to generate a second hash value; and
determine the first DLL fingerprint based on at least one of the first hash value or the second hash value.

14. The at least one non-transitory computer readable storage medium of claim 12, wherein the feature is at least one of the first OS path, a list of exported functions associated with the first DLL, digital signature information, a high-level language used to generate the first DLL, a compiler that compiled the first DLL, or a file version of the first DLL.

15. An apparatus to detect an attack at a computing device, the apparatus comprising:
means for determining to determine a first dynamic-link library (DLL) fingerprint of a first DLL referenced by an operating system (OS) event, the OS event generated by the computing device, the first DLL stored at a first OS path, and in response to determining that a second DLL is stored at a second OS path, a second DLL fingerprint of the second DLL, the second DLL having the same name as the first DLL, the second OS path superseding the first OS path;
means for comparing to compare the first DLL fingerprint and the second DLL fingerprint to a reference DLL fingerprint, and determine whether at least one of the first DLL fingerprint or the second DLL fingerprint satisfies a deviation threshold based on the comparison; and
means for executing a security action to protect the computing device from the attack in response to the deviation threshold being satisfied.

16. The apparatus of claim 15, wherein the OS event includes launching an executable by the computing device, the second OS path is a side-by-side assembly path, the means for determining is first means for determining, and further including second means for determining to:
determine whether the first DLL is included in the executable; and
in response to determining that the first DLL is included in the executable, determine whether the second DLL is stored at the second OS path.

17. The apparatus of claim 15, wherein the reference DLL fingerprint is a first reference fingerprint, and further including means for transmitting the first DLL to a server, wherein the means for executing is to, in response to obtaining an alert from the server, execute the security action, the alert indicative of the server determining that the first DLL satisfied the deviation threshold based on a comparison of the first DLL to a second reference fingerprint, the second reference fingerprint different from the first reference fingerprint.

18. The apparatus of claim 15, wherein the security action includes at least one of generating a log, blocking a first execution of at least one of the first DLL or the second DLL, or preventing a second execution of an executable that triggered the OS event.

19. The apparatus of claim 15, wherein the means for determining is to:
extract a feature from the first DLL;
execute a hash algorithm on the feature to generate a hash value; and
determine the first DLL fingerprint based on the hash value.

20. The apparatus of claim 19, wherein the feature is a first feature, the hash value is a first hash value, and the means for determining is to:
in response to determining that an executable triggered the OS event, extract a second feature from the executable;
execute the hash algorithm on the second feature to generate a second hash value; and
determine the first DLL fingerprint based on at least one of the first hash value or the second hash value.

21. The apparatus of claim 19, wherein the feature is at least one of the first OS path, a list of exported functions associated with the first DLL, digital signature information, a high-level language used to generate the first DLL, a compiler that compiled the first DLL, or a file version of the first DLL.

22. A method to detect an attack at a computing device, the method comprising:
determining a first dynamic-link library (DLL) fingerprint of a first DLL referenced by an operating system (OS) event, the OS event generated by the computing device, the first DLL stored at a first OS path;
in response to determining that a second DLL is stored at a second OS path, determining a second DLL fingerprint of the second DLL, the second DLL having the same name as the first DLL, the second OS path superseding the first OS path;
determining whether at least one of the first DLL fingerprint or the second DLL fingerprint satisfies a deviation threshold based on a comparison of the first DLL fingerprint and the second DLL fingerprint to a reference DLL fingerprint; and
in response to the deviation threshold being satisfied, executing a security action to protect the computing device from the attack.

23. The method of claim 22, wherein the OS event includes launching an executable by the computing device, the second OS path is a side-by-side assembly path, and further including:
determining whether the first DLL is included in the executable; and
in response to determining that the first DLL is included in the executable, determining whether the second DLL is stored at the second OS path.

24. The method of claim 22, wherein the reference DLL fingerprint is a first reference fingerprint, and further including:
transmitting the first DLL to a server; and
in response to obtaining an alert from the server, executing the security action, the alert indicative of the server determining that the first DLL satisfied the deviation threshold based on a comparison of the first DLL to a second reference fingerprint, the second reference fingerprint different from the first reference fingerprint.

25. The method of claim 22, wherein the security action includes at least one of generating a log, blocking a first execution of at least one of the first DLL or the second DLL, or preventing a second execution of an executable that triggered the OS event.

26. The method of claim 22, further including:
extracting a feature from the first DLL;
executing a hash algorithm on the feature to generate a hash value; and
determining the first DLL fingerprint based on the hash value.

27. The method of claim 26, wherein the feature is a first feature, the hash value is a first hash value, and further including:
in response to determining that an executable triggered the OS event, extracting a second feature from the executable;
executing the hash algorithm on the second feature to generate a second hash value; and
determining the first DLL fingerprint based on at least one of the first hash value or the second hash value.

28. The method of claim 26, wherein the feature is at least one of the first OS path, a list of exported functions associated with the first DLL, digital signature information, a high-level language used to generate the first DLL, a compiler that compiled the first DLL, or a file version of the first DLL.

29. An apparatus to detect an attack at a computing device, the apparatus comprising:
memory;
instructions; and
processor circuitry to execute the instructions to at least:
determine a first dynamic-link library (DLL) fingerprint of a first DLL referenced by an operating system (OS) event, the OS event generated by the computing device, the first DLL stored at a first OS path;
in response to determining that a second DLL is stored at a second OS path, determine a second DLL fingerprint of the second DLL, the second DLL having the same name as the first DLL, the second OS path superseding the first OS path;
determine whether at least one of the first DLL fingerprint or the second DLL fingerprint satisfies a deviation threshold based on a comparison of the first DLL fingerprint and the second DLL fingerprint to a reference DLL fingerprint; and
execute a security action to protect the computing device from the attack in response to the deviation threshold being satisfied.

30. The apparatus of claim 29, wherein the OS event includes launching an executable by the computing device, the second OS path is a side-by-side assembly path, and the processor circuitry is to execute the instructions to:
determine whether the first DLL is included in the executable; and
in response to determining that the first DLL is included in the executable, determine whether the second DLL is stored at the second OS path.

31. The apparatus of claim 29, wherein the reference DLL fingerprint is a first reference fingerprint, further including an interface to transmit the first DLL to a server, and in response to obtaining an alert from the server, the processor circuitry is to execute the instructions to execute the security action, the alert indicative of the server determining that the first DLL satisfied the deviation threshold based on a comparison of the first DLL to a second reference fingerprint, the second reference fingerprint different from the first reference fingerprint.

32. The apparatus of claim 29, wherein the security action includes at least one of generating a log, blocking a first execution of at least one of the first DLL or the second DLL, or preventing a second execution of an executable that triggered the OS event.

33. The apparatus of claim 29, wherein the processor circuitry is to execute the instructions to:
extract a feature from the first DLL;
execute a hash algorithm on the feature to generate a hash value; and
determine the first DLL fingerprint based on the hash value.

34. The apparatus of claim 33, wherein the feature is a first feature, the hash value is a first hash value, and the processor circuitry is to execute the instructions to:
in response to determining that an executable triggered the OS event, extract a second feature from the executable;
execute the hash algorithm on the second feature to generate a second hash value; and
determine the first DLL fingerprint based on at least one of the first hash value or the second hash value.

35. The apparatus of claim 33, wherein the feature is at least one of the first OS path, a list of exported functions associated with the first DLL, digital signature information, a high-level language used to generate the first DLL, a compiler that compiled the first DLL, or a file version of the first DLL.

* * * * *